United States Patent
Mashiki et al.

(10) Patent No.: US 7,685,994 B2
(45) Date of Patent: Mar. 30, 2010

(54) VARIABLE VALVE TIMING APPARATUS AND METHOD OF DETECTING VALVE PHASE THEREOF

(75) Inventors: Zenichiro Mashiki, Nisshin (JP); Yasumichi Inoue, Toyota (JP); Noboru Takagi, Toyota (JP); Yoshihito Moriya, Nagoya (JP); Haruyuki Urushihata, Chiryu (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 0 days.

(21) Appl. No.: 12/295,148

(22) PCT Filed: Feb. 28, 2007

(86) PCT No.: PCT/JP2007/054381
§ 371 (c)(1),
(2), (4) Date: Sep. 29, 2008

(87) PCT Pub. No.: WO2007/111095
PCT Pub. Date: Oct. 4, 2007

(65) Prior Publication Data
US 2009/0255510 A1   Oct. 15, 2009

(30) Foreign Application Priority Data
Mar. 27, 2006  (JP) ............................... 2006-085539
Aug. 14, 2006  (JP) ............................... 2006-221036

(51) Int. Cl.
*F02D 19/00* (2006.01)
*F01L 1/34* (2006.01)

(52) U.S. Cl. ..................... 123/347; 123/90.17; 701/103

(58) Field of Classification Search ......... 701/101–103, 701/110, 114; 123/90.11, 90.15–90.18, 347, 123/348
See application file for complete search history.

(56) References Cited

U.S. PATENT DOCUMENTS

| | | | |
|---|---|---|---|
| 4,928,640 A | 5/1990 | van Vuuren et al. | |
| 6,213,067 B1 | 4/2001 | Takahashi et al. | |
| 6,318,343 B1 * | 11/2001 | Nakagawa et al. | 123/500 |
| 6,571,757 B1 | 6/2003 | Simpson | |
| 6,840,235 B2 * | 1/2005 | Koseki et al. | 123/568.14 |
| 7,194,998 B2 * | 3/2007 | Fuwa et al. | 123/346 |

(Continued)

FOREIGN PATENT DOCUMENTS

JP          04-506851 A    11/1992

(Continued)

*Primary Examiner*—Stephen K Cronin
*Assistant Examiner*—Johnny H Hoang
(74) *Attorney, Agent, or Firm*—Sughrue Mion, PLLC

(57) ABSTRACT

When the engine speed is high (determination of YES at S100), actual intake valve phase is calculated based on rotation phase difference between rotation angles of crankshaft and camshaft, detected by using a crank angle signal and a cam angle signal, and actual valve timing is detected therefrom. When the engine speed is low (determination of NO at S100) and the crank angle signal and cam angle signal are unstable, an amount of change in camshaft rotation phase by the VVT mechanism in accordance with the operation amount of actuator detected by a motor rotation angle signal is calculated successively, and based on an accumulation of the amount of change, the actual intake valve phase is calculated, and the actual valve timing is detected.

18 Claims, 14 Drawing Sheets

U.S. PATENT DOCUMENTS

| | | |
|---|---|---|
| 7,308,877 B2 | 12/2007 | Izumi et al. |
| 7,409,283 B2 * | 8/2008 | Yasui .......................... 701/106 |
| 2005/0076867 A1 | 4/2005 | Tani |
| 2005/0188935 A1 | 9/2005 | Neubauer et al. |
| 2006/0042578 A1 | 3/2006 | Izumi et al. |

FOREIGN PATENT DOCUMENTS

| | | |
|---|---|---|
| JP | 2003-295953 A | 10/2003 |
| JP | 2004-162706 A | 6/2004 |
| JP | 2005-299640 A | 10/2005 |
| JP | 2006-070754 A | 3/2006 |

* cited by examiner

VARIABLE VALVE TIMING APPARATUS AND METHOD OF DETECTING VALVE PHASE THEREOF

TECHNICAL FIELD

The present invention relates to a variable valve timing apparatus. In particular, the invention relates to a variable valve timing apparatus having a motor as an actuator (having a mechanism that changes the timing at which a valve is opened/closed by an amount of change according to an operation amount of an actuator).

BACKGROUND ART

A VVT (Variable Valve Timing) apparatus has conventionally been known that changes the phase (crank angle) in (at) which an intake valve or an exhaust valve is opened/closed, according to an operating condition. Generally, in the variable valve timing apparatus, the phase is changed by rotating a camshaft, which opens/closes the intake valve or exhaust valve, relative to a sprocket or the like. The camshaft is rotated by an actuator such as a hydraulic or electric motor.

For accurate control of the valve timing using such a variable valve timing, it is necessary to detect the actual valve timing (that is, camshaft phase) at present, with high accuracy. In this regard, Patent Document 1 (PCT application National Publication No. 04-506851) discloses a variable valve timing apparatus in which camshaft phase is feedback-controlled through autocalibration of sensor measurement offset.

A hydraulic variable valve timing apparatus has a problem that control accuracy of variable valve timing deteriorates in cold climates or at the start of engine operation, as the hydraulic pressure decreases or response of hydraulic control slows down. Therefore, a variable valve timing apparatus using an electric motor as a driving source has been proposed (see, for example, Japanese Patent Laying-Open No. 2003-295953 and Japanese Patent Laying-Open No. 2004-162706).

Patent Document 2 (Japanese Patent Laying-Open No. 2003-295953) discloses, for a variable valve timing apparatus using a DC servomotor as an actuator, an arrangement preventing variation of response performance dependent on position of rotation of the controlled object and ensuring uniform control response at every controlled position of rotation. As to the detection of rotation angle (phase) of the controlled object, however, this reference simply describes that it is detected by using an output of a rotation angle sensor. Any technique for improving detection accuracy is not discussed.

Patent Document 3 (Japanese Patent Laying-Open No. 2004-162706) discloses a variable valve timing apparatus allowing variable valve timing by changing the rotation speed of the motor with respect to the rotation speed of the camshaft. According to Patent Document 3, in the variable valve timing apparatus as such, based on a crank angle signal output from a crank angle sensor and on a cam angle signal output from a cam angle sensor, an actual valve timing at the time when the cam angle signal was output is calculated. Further, the amount of change of valve timing from the actual valve timing when the cam angle signal was output is calculated based on the difference in rotation speed between the motor and the camshaft, and using the actual valve timing when the cam angle signal was output and the amount of change of the valve timing, the final, actual valve timing is calculated. Therefore, even at a timing in the interval of cam angle signal generation, which signal is output every time the camshaft rotates by a prescribed angle, the valve timing can be detected in an interpolating manner.

When the engine speed is high and the interval of cam angle signal generation becomes short, it is not much necessary to execute calculation of the amount of change in valve-timing in the interpolating manner as in Patent Document 3. On the contrary, when the engine speed is low, particularly when the engine is stopped or the engine is in a low rotation range where the engine speed is unstable, it is difficult to detect with high accuracy the actual valve timing based on the crank angle signal and the cam angle signal. Namely, the range of engine speed has an influence on the accuracy of detecting actual valve timing.

In the variable valve timing apparatus according to Patent Document 3, the amount of change in valve timing is continuously calculated based on the difference in rotation speed between the motor and the camshaft. Therefore, computational load for calculating the valve timing increases. This may lead to an increased cost, for example, for applying a processor capable of high-speed, large-volume processing. Patent Documents 1 and 2 are silent about the necessary consideration of computational load inherent to the detection of actual valve timing.

DISCLOSURE OF THE INVENTION

An object of the present invention is to provide a variable valve timing apparatus ensuring accuracy in detecting actual valve timing, without excessively increasing computational load, in response to the variation in engine speed.

The present invention provides a variable valve timing apparatus for changing a timing of opening/closing at least one of an intake valve and an exhaust valve provided in an engine, including an actuator, a changing mechanism, first to third detectors and a phase detecting portion. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator. The first detector is configured to detect a rotation angle of the crankshaft. The second detector is configured to detect a rotation angle of the camshaft. The third detector is configured to detect the operation amount of the actuator. The phase detecting portion detects the actual opening/closing timing of the valve, of which opening/closing timing is to be changed, based on outputs of the first to third detectors. Further, the phase detecting portion includes a first calculating portion, a second calculating portion and a first selecting portion. The first calculating portion calculates the actual opening/closing timing based on a relation of a rotation angle of the crankshaft relative to a rotation angle of the camshaft. The second calculating portion calculates the actual opening/closing timing based on an accumulated amount of change of the difference in rotation phase of the camshaft in accordance with the operation amount of the actuator. The first selecting portion selects one of the first and second calculating portions dependent on engine speed, for detecting the actual opening/closing timing.

Alternatively, the present invention provides a variable valve timing apparatus for changing a timing of opening/closing at least one of an intake valve and an exhaust valve provided in an engine, including an actuator, a changing mechanism, first to third detectors, and a controller. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator. The first detector detects a rotation angle of the crankshaft. The second detector detects a rotation angle of the camshaft. The third detector detects the operation amount of the actuator. The controller detects actual opening/closing timing of the valve, of which opening/closing timing is to be changed, based on outputs of the first to third detectors. Further, the controller is configured to select one of a first calculating operation for calculating the actual opening/closing timing based on a relation of a rotation angle of the crankshaft relative to a rotation angle of the camshaft and a second calculating operation for calculating the actual opening/closing timing based on an accumulated amount of change of the difference in rotation phase of the camshaft in accordance with the operation amount of the actuator, dependent on engine speed, for detecting the actual opening/closing timing.

The present invention provides a method of detecting a valve phase of a variable valve timing apparatus for changing a timing of opening/closing at least one of an intake valve and an exhaust valve provided in an engine, including first and second calculating steps and a first selecting step. The variable valve timing apparatus includes an actuator, a changing mechanism, and first to third detectors. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator. The first detector detects a rotation angle of the crankshaft. The second detector detects a rotation angle of the camshaft. The third detector detects the operation amount of the actuator. At the first calculating step, actual opening/closing timing of the valve, of which opening/closing timing is to be changed, is calculated, based on a relation of the detected rotation angle of the crankshaft relative to the detected rotation angle of the camshaft. At the second calculating step, the actual opening/closing timing is calculated based on a detected accumulated amount of change of the difference in rotation phase of the camshaft in accordance with the operation amount of the actuator. At the first selecting step, one of the first and second calculating steps is selected dependent on engine speed, for detecting the actual opening/closing timing.

According to the variable valve timing apparatus or the valve phase detecting method thereof, the first calculating method in which rotation angles of crankshaft and camshaft are detected and actual opening/closing timing (actual valve timing) is determined based on the relation of rotational phase of the crankshaft relative to the camshaft, and the second calculating method in which the actual valve timing is calculated based on an accumulated amount of change in camshaft rotation phase attained by the changing mechanism that changes the rotation phase in accordance with operation amount of the actuator, may be selected appropriately in accordance with the range of engine speed, and the actual valve timing can be detected thereby. Therefore, excessive increase of computational load caused by continuous execution of the second calculating method can be avoided, and the actual valve timing can be detected with sufficiently high accuracy in any range of engine speed.

Preferably, in the variable valve timing apparatus of the present invention, the first selecting portion selects the first calculating portion when the engine speed is higher than a prescribed value, and selects the second calculating portion when the engine speed is not higher than the prescribed value. Alternatively, the controller is configured to detect the actual opening/closing timing based on the first calculating operation when the engine speed is higher than a prescribed value, and to detect the actual opening/closing timing based on the second calculating operation when the engine speed is not higher than the prescribed value.

According to the method of detecting valve phase for a variable valve timing apparatus of the present invention, at the first selecting step, when the engine speed is higher than a prescribed value, the first calculating step is selected, and when the engine speed is not higher than the prescribed value, the second calculating step is selected.

In the variable valve timing apparatus described above, even in the range of low speed of rotation where the rotation speeds of crankshaft and camshaft are low and unstable, the actual valve timing can be detected with sufficiently high accuracy based on accumulation of the amount of change in camshaft rotation phase attained by the changing mechanism in accordance with operation amount of the actuator (the second calculating method). Further, in the range of high rotation speed where rotation speeds of crankshaft and camshaft are relatively stable and the frequency of valve timing calculation based on the detection of rotation angles of crankshaft and camshaft increases, the valve timing detection by the second calculating method is not executed. Therefore, excessive increase in computational load can be avoided while the actual valve timing can efficiently be detected with sufficiently high accuracy.

More preferably, the variable valve timing apparatus further includes an abnormality processing portion. The abnormality processing portion stops, when abnormality occurs in the third detector while engine speed is in the range in which the first selecting portion selects the second calculating portion, detection of the actual opening/closing timing, and inhibits a change of the opening/closing timing by the actuator. Particularly in such a configuration, the abnormality processing portion includes a power supply stopping portion. The power supply stopping portion stops power supply to the actuator, when abnormality occurs in the third detector while engine speed is in such a range.

Alternatively, the controller is configured to stop, when abnormality occurs in the third detector while engine speed is in the range in which the actual opening/closing timing is to be detected by the second calculating operation, detection of the actual opening/closing timing and to inhibit change of the opening/closing timing by the actuator. Further, the controller may be configured to stop power supply to the actuator, when abnormality occurs in the third detector in such a range of engine speed.

More preferably, the method of detecting valve phase of a variable valve timing apparatus further includes an abnormality processing step. At the abnormality processing step, detection of the actual opening/closing timing is stopped when abnormality occurs in the third detector while engine speed is in the range in which the second calculation step is selected at the first selecting step, and the change of the opening/closing timing by the actuator is inhibited. Alternatively, the method further includes a step of stopping power supply to the actuator, when the change of the opening/closing timing is stopped at the abnormality processing step.

By such a configuration, in such a range of engine speed that the actual valve timing is detected based on the amount of actuator operation, when detection of actuator operation amount fails (typically at the time of sensor failure), abnormal control of valve timing based on the erroneous detection of valve timing can be prevented.

Preferably, in the variable valve timing apparatus of the present invention, the phase detecting portion further includes a second selecting portion and a third calculating portion. The second selecting portion selects both the first calculating portion and the second calculating portion for detecting the actual opening/closing timing, in a prescribed range of engine speed. The third calculating portion is configured to calculate the actual opening/closing timing by modifying a value calculated by the first calculating portion by a value calculated by the second calculating portion, in the prescribed range of engine speed. Alternatively, the controller is further configured to perform both the first calculating operation and the second calculating operation in a prescribed range of engine speed, and to calculate the actual opening/closing timing by modifying a value calculated by the first calculating operation by a value calculated by the second calculating operation.

Preferably, the method of detecting valve phase of a variable valve timing apparatus further includes a second selecting step and a third calculating step. At the second selecting step, both the first and second calculating steps are selected to detect the actual opening/closing timing in a prescribed range of engine speed. At the third calculating step, the actual opening/closing timing is calculated by modifying a value calculated at the first calculating step by a value calculated at the second calculating step.

In the variable valve timing apparatus or the method of detecting valve phase thereof, in a prescribed range of engine speed, the actual valve timing can be detected while valve timing calculation based on the detection of rotation angles of the crankshaft and camshaft (first calculating method) is backed-up by valve timing calculation based on the accumulation of amount of change in camshaft rotation phase in accordance with operation amount of the actuator (second calculating method). Therefore, the accuracy of detecting actual valve timing at a border between the range where application of the first calculating method is preferred (range of high rotation speed) and the range where application of the second calculating method is preferred (range of low rotation speed) can be improved.

More preferably, the phase detecting portion further includes a fourth calculating portion. The fourth calculating portion is configured to calculate the actual opening/closing timing, based on the value calculated by the first calculating portion, without using the value calculated by the second calculating portion, when abnormality occurs in the third detector in the prescribed range of engine speed. Alternatively, the controller is further configured to calculate the actual opening/closing timing, based on the value calculated by the first calculating operation, without using the value calculated by the second calculating operation, when abnormality occurs in the third detector in the prescribed range of engine speed.

More preferably, the method of detecting valve phase of a variable valve timing apparatus further includes a fourth calculating step. At the fourth calculating step, the actual opening/closing timing is calculated, based on the value calculated at the first calculating step, without using the value calculated at the second calculating step, when abnormality occurs in the third detector in the prescribed range of engine speed.

Because of such a configuration, when detection of actuator operation amount fails (typically at the time of sensor failure), error in detecting the actual valve timing resulting from the abnormal detection value can be prevented.

More preferably, in the variable valve timing apparatus or in the method of detecting valve phase thereof, the actuator is formed of a motor, and the operation amount of the actuator is difference in rotation speed of the motor relative to the camshaft. The changing mechanism changes the opening/closing timing such that ratio of amount of change of the opening/closing timing to the operation amount of the actuator differs and direction of change of the opening/closing timing is the same when the opening/closing timing is in a first region and when it is in a second region.

Further, the second calculating portion calculates amount of change of the actual opening/closing timing, based on correspondence between the opening/closing timing and the ratio obtained in advance and on the relative difference in rotation speed of the motor, and calculates the actual opening/closing timing at present by adding the calculated amount of change to the actual opening/closing timing calculated last time. Alternatively, the controller is further configured to calculate amount of change of the actual opening/closing timing, based on correspondence between the opening/closing timing and the ratio obtained in advance and on the relative difference in rotation speed of the motor, and to calculate the actual opening/closing timing at present by adding the calculated amount of change to the actual opening/closing timing calculated last time. Further, the second calculating step has a sub-step of calculating an amount of change of the actual opening/closing timing, based on correspondence between the opening/closing timing and the ratio obtained in advance and the relative difference in rotation speed of the motor, and a sub-step of calculating the actual opening/closing timing at present by adding the calculated amount of change to the actual opening/closing timing calculated last time.

According to the variable valve timing apparatus or the method of detecting valve phase thereof, even in a configuration in which the ratio of the amount of change in valve timing relative to the actuator operation amount varies in accordance with the current valve timing, the accuracy of detecting valve opening/closing timing can be ensured based on the accumulation of the amount of change in camshaft phase in accordance with operation amount of the actuator.

Alternatively, or more preferably, in the variable valve timing apparatus or the method of detecting valve phase thereof, the actuator is formed of a motor, and operation amount of the actuator is difference in rotation speed of the motor relative to the camshaft. The variable valve timing apparatus further includes a command value setting portion and a motor control unit. The command value setting portion sets a rotation speed command value of the motor in accordance with the relative difference in rotation speed of the motor corresponding to required amount of change of the opening/closing timing. The motor control unit controls rotation speed of the motor in accordance with the rotation speed command value by the command value setting portion. The motor control unit controls power supply to the motor by a combination of setting control based on the rotation speed command value set by the command value setting portion and the relative difference in rotation speed of the motor, and feedback control based on deviation of actual rotation speed from the rotation speed command value. Alternatively, the controller sets a rotation speed command value of the motor in accordance with the relative difference in rotation speed of the motor corresponding to required amount of change of the opening/closing timing.

According to the variable valve timing apparatus or the method of detecting valve phase thereof, as compared with a simple feedback control based on the deviation in control amount of the electric motor (such as the deviation of rotation speed), it is possible to adjust the actuator operation amount (such as the rotation speed of electric motor) to more quickly follow the variation in operation command value related to the operation amount of the actuator (for example, rotation speed command value of the electric motor).

Therefore, a main advantage of the present invention is that in the variable valve timing apparatus, the accuracy of detecting actual valve timing can be ensured without excessively increasing computational load, in response to the variation in engine speed.

BEST MODES FOR CARRYING OUT THE INVENTION

Figure 1:
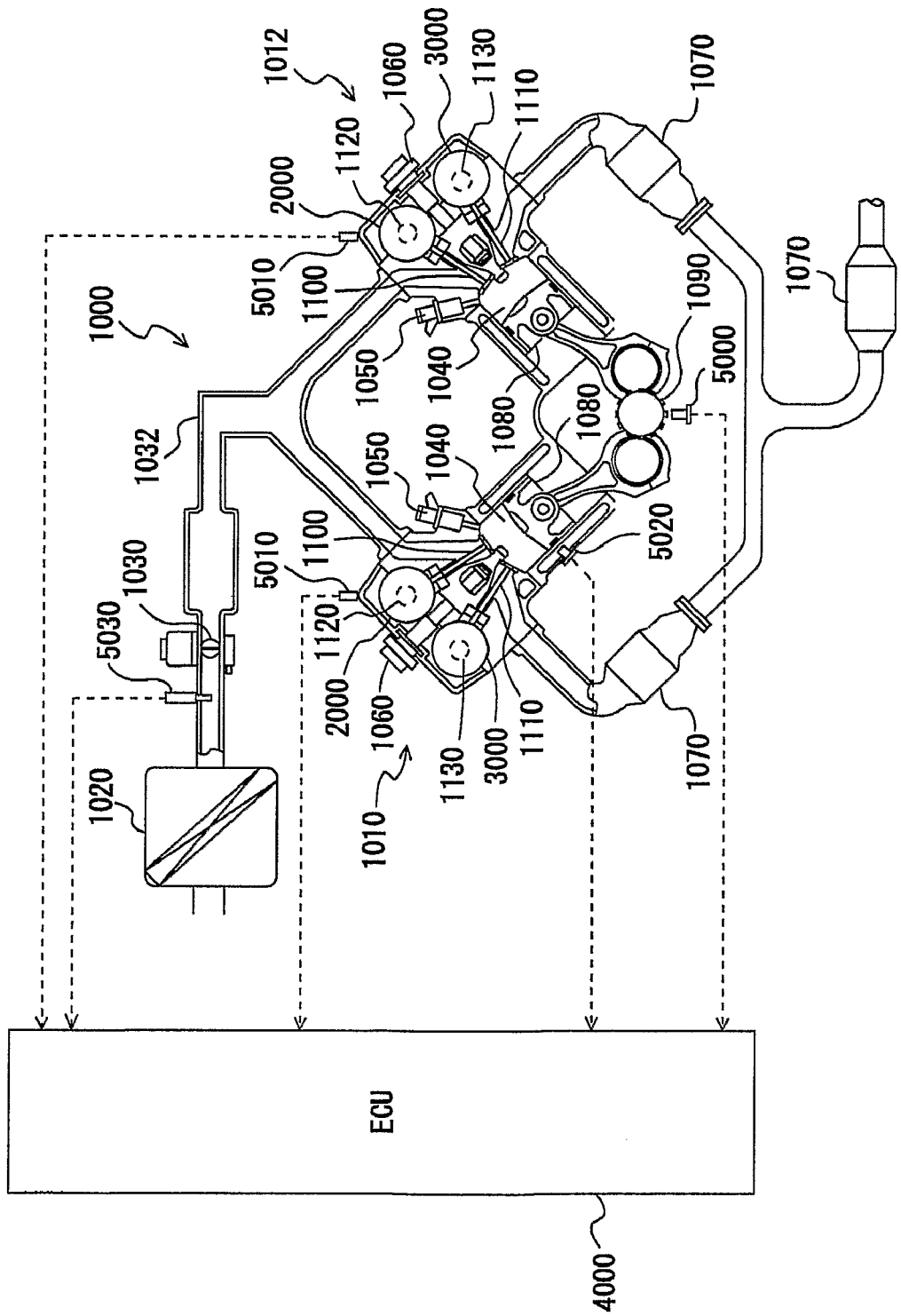
FIG. 1 is a schematic diagram showing a configuration of an engine of a vehicle on which a variable valve timing apparatus is mounted according to an embodiment of the present invention.

With reference to the drawings, embodiments of the present invention will be hereinafter described. In the following description, like components are denoted by like reference characters. Their names and functions are also the same. Therefore, detailed description thereof will not be repeated.

Referring to FIG. 1, a description is given of an engine of a vehicle on which a variable valve timing apparatus is mounted, according to an embodiment of the present invention.

An engine 1000 is a V-type 8-cylinder engine having a first bank 1010 and a second bank 1012 each including a group of four cylinders. Here, application of the present invention is not limited to any engine type, and the variable valve timing apparatus that will be described in the following is applicable to an engine of the type different from the V-type 8 cylinder engine.

Into engine 1000, air is sucked from an air cleaner 1020. The quantity of sucked air is adjusted by a throttle valve 1030. Throttle valve 1030 is an electronic throttle valve driven by a motor.

The air is supplied through an intake manifold 1032 into a cylinder 1040. The air is mixed with fuel in cylinder 1040 (combustion chamber). Into cylinder 1040, the fuel is directly injected from an injector 1050. In other words, injection holes of injector 1050 are provided within cylinder 1040.

The fuel is injected in the intake stroke. The fuel injection timing is not limited to the intake stroke. Further, in the present embodiment, engine 1000 is described as a direct-injection engine having injection holes of injector 1050 that are disposed within cylinder 1040. However, in addition to direct-injection (in-cylinder) injector 1050, a port injector may be provided. Moreover, only the port injector may be provided.

The air-fuel mixture in cylinder 1040 is ignited by a spark plug 1060 and accordingly burned. The air-fuel mixture after burned, namely exhaust gas, is cleaned by a three-way catalyst 1070 and thereafter discharged to the outside of the vehicle. The air-fuel mixture is burned to press down a piston 1080 and thereby to rotate a crankshaft 1090.

At the top of cylinder 1040, an intake valve 1100 and an exhaust valve 1110 are provided. Intake valve 1100 is driven by an intake camshaft 1120. Exhaust valve 1110 is driven by an exhaust camshaft 1130. Intake camshaft 1120 and exhaust camshaft 1130 are coupled by such parts as a chain and gears to be rotated at the same rotation speed (one-half the rotation speed of crankshaft 1090). The rotation speed of a rotating body such as a shaft is generally represented by the number of rotation per unit time (typically, number of rotation per minute: rpm).

Intake valve 1100 has its phase (opening/closing timing) controlled by an intake VVT mechanism 2000 provided to intake camshaft 1120. Exhaust valve 1110 has its phase (opening/closing timing) controlled by an exhaust VVT mechanism 3000 provided to exhaust camshaft 1130.

In the present embodiment, intake camshaft 1120 and exhaust camshaft 1130 are rotated by the VVT mechanisms to control respective phases of intake valve 1100 and exhaust valve 1110. Here, the phase control method is not limited to the one described above.

Figure 3:
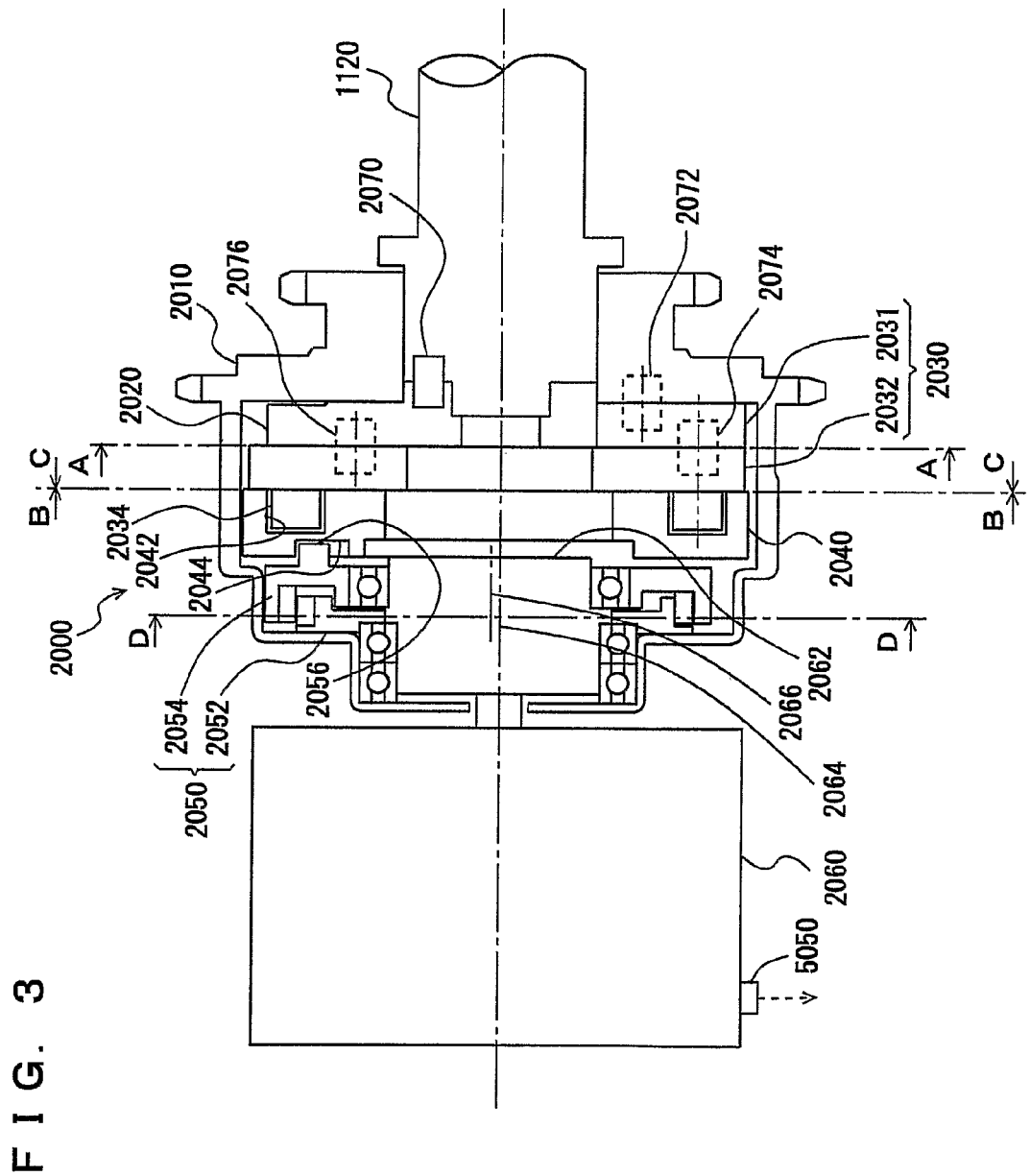
FIG. 3 is a cross section showing an intake VVT mechanism.

Intake VVT mechanism 2000 is operated by an electric motor 2060 (shown in FIG. 3). Electric motor 2060 is controlled by an Electronic Control Unit (ECU) 4000. The current and voltage of electric motor 2060 are detected by an ammeter (not shown) and a voltmeter (not shown) and the measurements are input to ECU 4000.

Exhaust VVT mechanism 3000 is hydraulically operated. Here, intake VVT mechanism 2000 may be hydraulically operated while exhaust VVT mechanism 3000 may be operated by an electric motor.

To ECU 4000, signals indicating the rotation speed and the crank angle of crankshaft 1090 are input from a crank angle sensor 5000. Further, to ECU 4000, signals indicating respective phases of intake camshaft 1120 and exhaust camshaft 1130 (phase: the camshaft position in the rotational direction) are input from a cam position sensor 5010.

Furthermore, to ECU 4000, a signal indicating the water temperature (coolant temperature) of engine 1000 from a coolant temperature sensor 5020 as well as a signal indicating the quantity of intake air (quantity of air taken or sucked into engine 1000) of engine 1000 from an airflow meter 5030 are input.

Based on these signals input from the sensors as well as a map and a program stored in a memory (not shown), ECU 4000 controls the throttle opening position, the ignition timing, the fuel injection timing, the quantity of injected fuel, the phase of intake valve 1100 and the phase of exhaust valve 1110 for example, so that engine 1000 is operated in a desired operating state.

Figure 2:
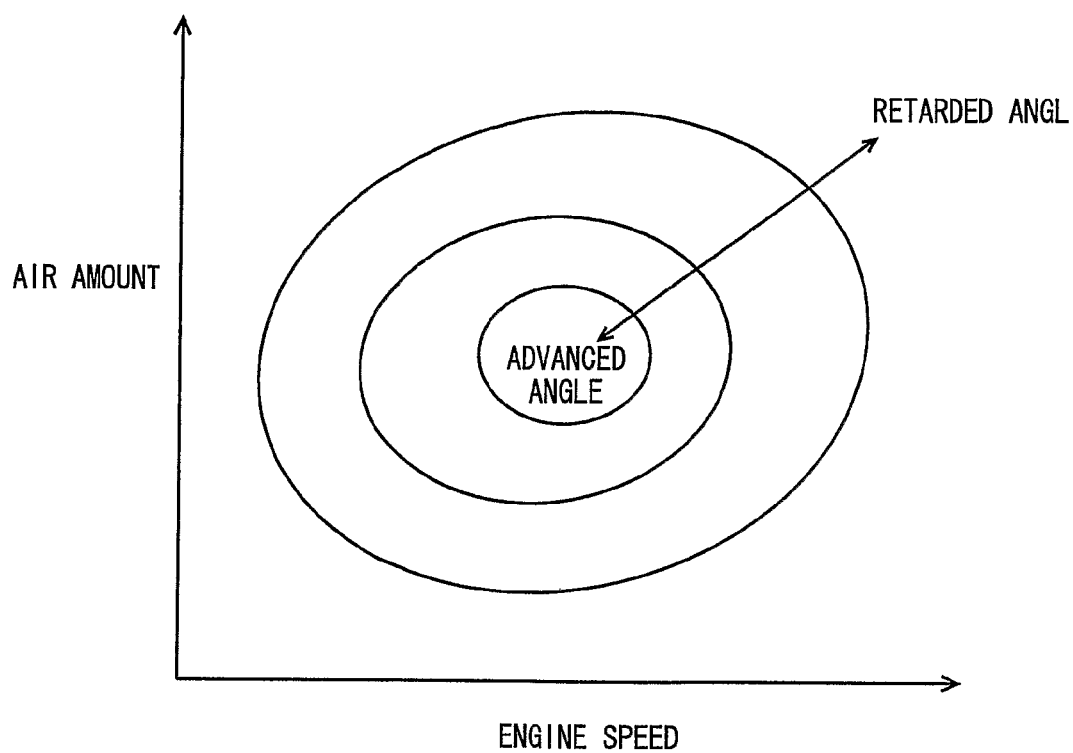
FIG. 2 shows a map defining the phase of an intake camshaft.

In the present embodiment, ECU 4000 determines the phase of intake valve 1100 based on the map as shown in FIG. 2 that uses the engine speed NE and the intake air quantity KL as parameters. A plurality of maps for respective coolant temperatures are stored for determining the phase of intake valve 1100.

In the following, a further description is given of intake VVT mechanism 2000. Here, exhaust VVT mechanism 3000 may have the same configuration as that of intake VVT mechanism 2000 as described below, or each of intake VVT mechanism 2000 and exhaust VVT mechanism 3000 may have the same configuration as that of intake VVT mechanism 2000 as described below.

As shown in FIG. 3, intake VVT mechanism 2000 includes a sprocket 2010, a cam plate 2020, a link mechanism 2030, a guide plate 2040, reduction gears 2050, and electric motor 2060.

Sprocket 2010 is coupled via a chain or the like to crankshaft 1090. The rotation speed of sprocket 2010 is half the rotation speed of crankshaft 1090, as in the case of intake camshaft 1120 and exhaust camshaft 1130. Intake camshaft 1120 is provided concentrically with the rotational axis of sprocket 2010 and rotatable relative to sprocket 2010.

Cam plate 2020 is coupled to intake camshaft 1120 with a pin (1) 2070. Cam plate 2020 rotates, in sprocket 2010, together with intake camshaft 1120. Here, cam plate 2020 and intake camshaft 1120 may be integrated into one unit.

Figure 4:
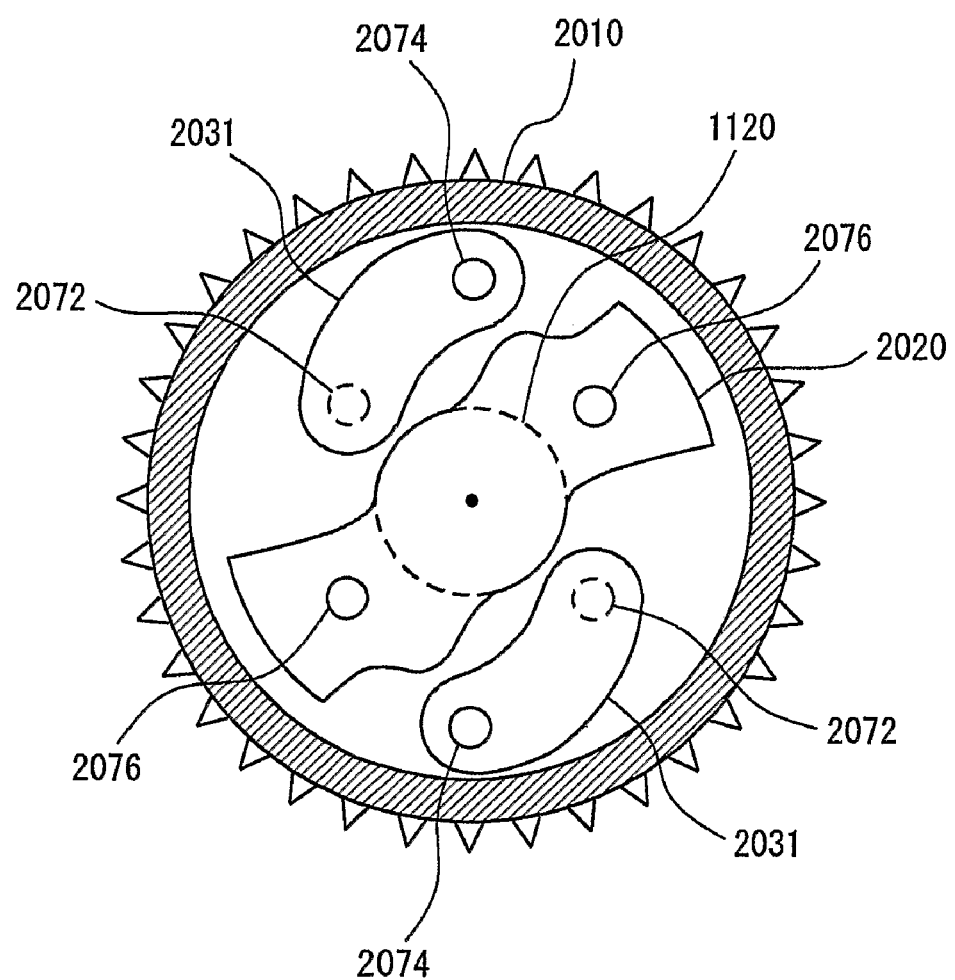
FIG. 4 is a cross section along A-A in FIG. 3.

Link mechanism 2030 is comprised of an arm (1) 2031 and an arm (2) 2032. As shown in FIG. 4, which is a cross section along A-A in FIG. 3, a pair of arms (1) 2031 is provided within sprocket 2010 so that the arms are point symmetric to each other with respect to the rotational axis of intake camshaft 1120. Each arm (1) 2031 is coupled to sprocket 2010 so that the arm can swing about a pin (2) 2072.

Figure 5:
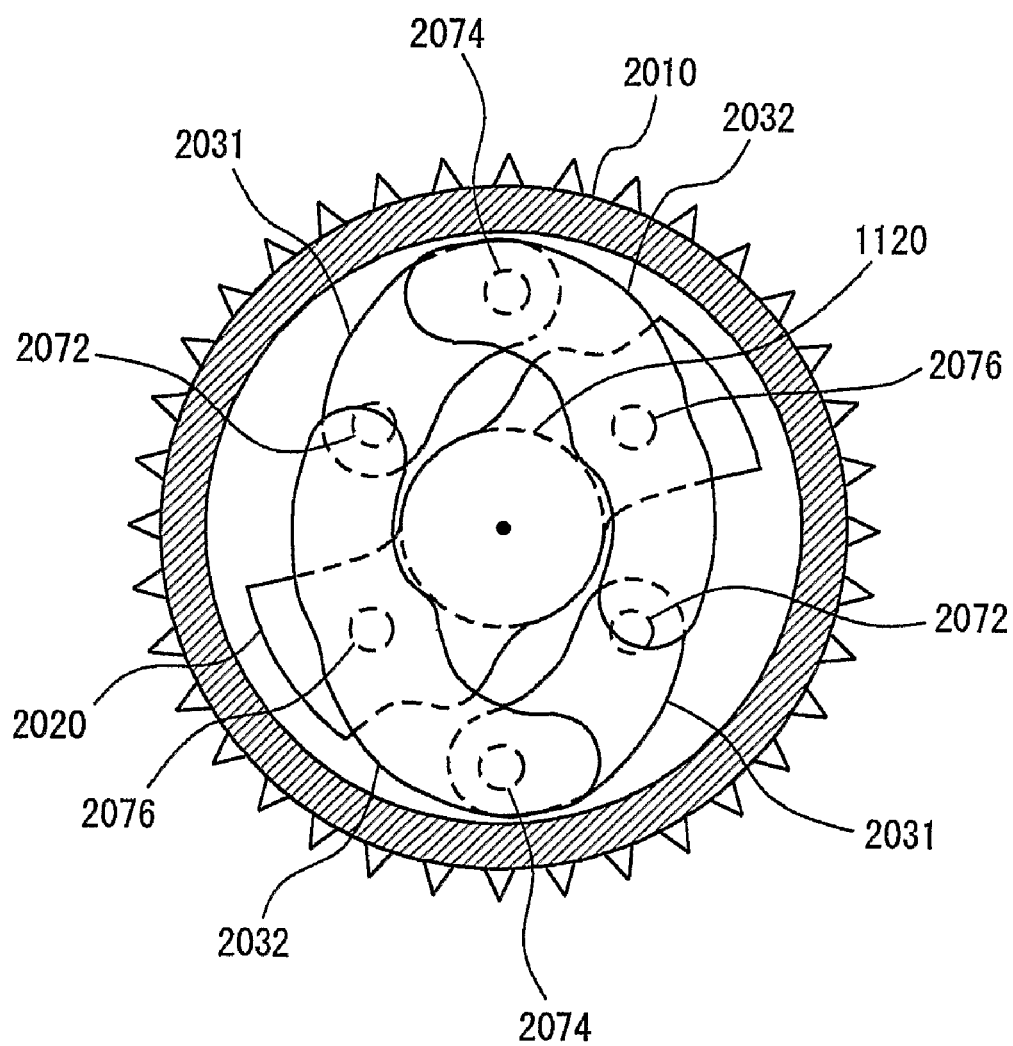
FIG. 5 is a (first) cross section along B-B in FIG. 3.
Figure 6:
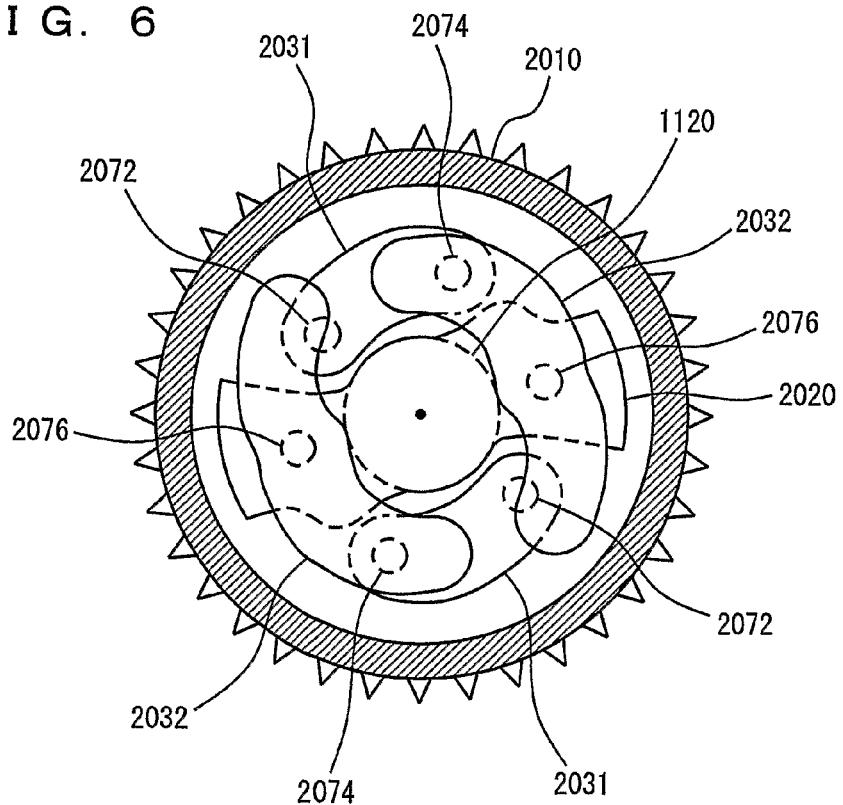
FIG. 6 is a (second) cross section along B-B in FIG. 3.

As shown in FIG. 5, which is a cross section along B-B in FIG. 3, and as shown in FIG. 6 showing the state where the phase of intake valve 1100 is advanced with respect to the state in FIG. 5, arms (1) 2031 and cam plate 2020 are coupled by arms (2) 2032.

Arm (2) 2032 is supported such that the arm can swing about a pin (3) 2074 and with respect to arm (1) 2031. Further, arm (2) 2032 is supported such that the arm can swing about a pin (4) 2076 and with respect to cam plate 2020.

A pair of link mechanisms 2030 causes intake camshaft 1120 to rotate relative to sprocket 2010 and thereby changes the phase of intake valve 1100. Thus, even if one of the paired link mechanisms 2030 should be damaged or broken, the other link mechanism can be used to change the phase of intake valve 1100.

Referring back to FIG. 3, at a surface of each link mechanism 2030 (arm (2) 2032) that is a surface facing guide plate 2040, a control pin 2034 is provided. Control pin 2034 is provided concentrically with pin (3) 2074. Each control pin 2034 slides in a guide groove 2042 provided in guide plate 2040.

Each control pin 2034 slides in guide groove 2042 of guide plate 2040, to be shifted in the radial direction. The radial shift of each control pin 2034 causes intake camshaft 1120 to rotate relative to sprocket 2010.

Figure 7:
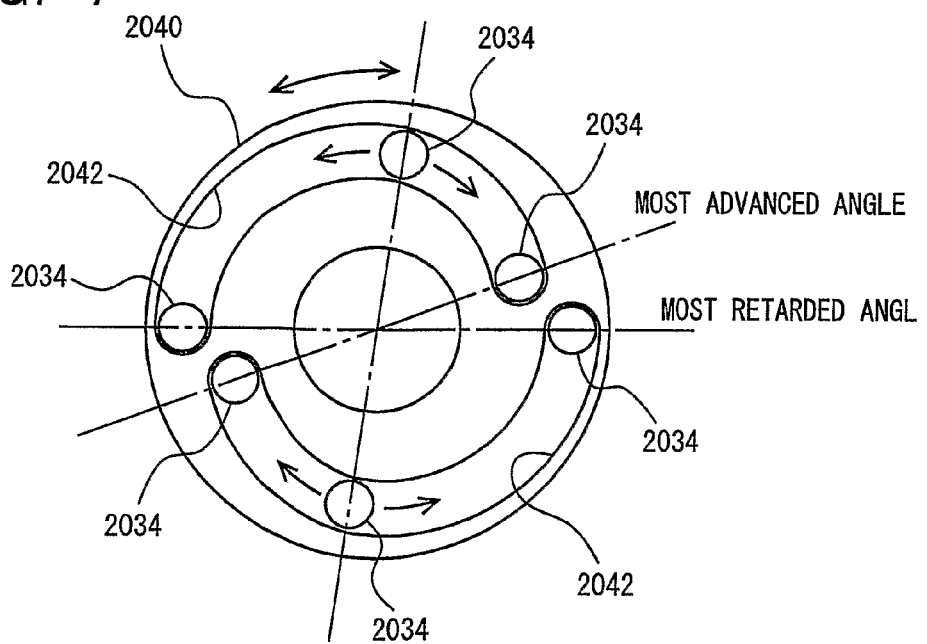
FIG. 7 is a cross section along C-C in FIG. 3.

As shown in FIG. 7, which is a cross section along C-C in FIG. 3, guide groove 2042 is formed in the spiral shape so that rotation of guide plate 2040 causes each control pin 2034 to shift in the radial direction. Here, the shape of guide groove 2042 is not limited to this.

As control pin 2034 is shifted further in the radial direction from the axial center of guide plate 2040, the phase of intake valve 1100 is retarded to a greater extent. In other words, the amount of change of the phase has a value corresponding to the operation amount of link mechanism 2030 generated by the radial shift of control pin 2034. Alternatively, the phase of intake valve 1100 may be advanced to a greater extent as control pin 2034 is shifted further in the radial direction from the axial center of guide plate 2040.

As shown in FIG. 7, when control pin 2034 abuts on an end of guide groove 2042, the operation of link mechanism 2030 is restrained. Therefore, the phase in which control pin 2034 abuts on an end of guide groove 2042 is the phase of the most retarded angle or the most advanced angle.

Referring back to FIG. 3, in guide plate 2040, a plurality of depressed portions 2044 are provided in its surface facing reduction gears 2050, for coupling guide plate 2040 and reduction gears 2050 to each other.

Reduction gears 2050 are comprised of an outer teeth gear 2052 and an inner teeth gear 2054. Outer teeth gear 2052 is fixed with respect to sprocket 2010 so that the gear rotates together with sprocket 2010.

Inner teeth gear 2054 has a plurality of protruded portions 2056 thereon that are received in depressed portions 2044 of guide plate 2040. Inner teeth gear 2054 is supported rotatably about an eccentric axis 2066 of a coupling 2062 formed eccentrically with respect to an axial center 2064 of an output shaft of electric motor 2060.

Figure 8:
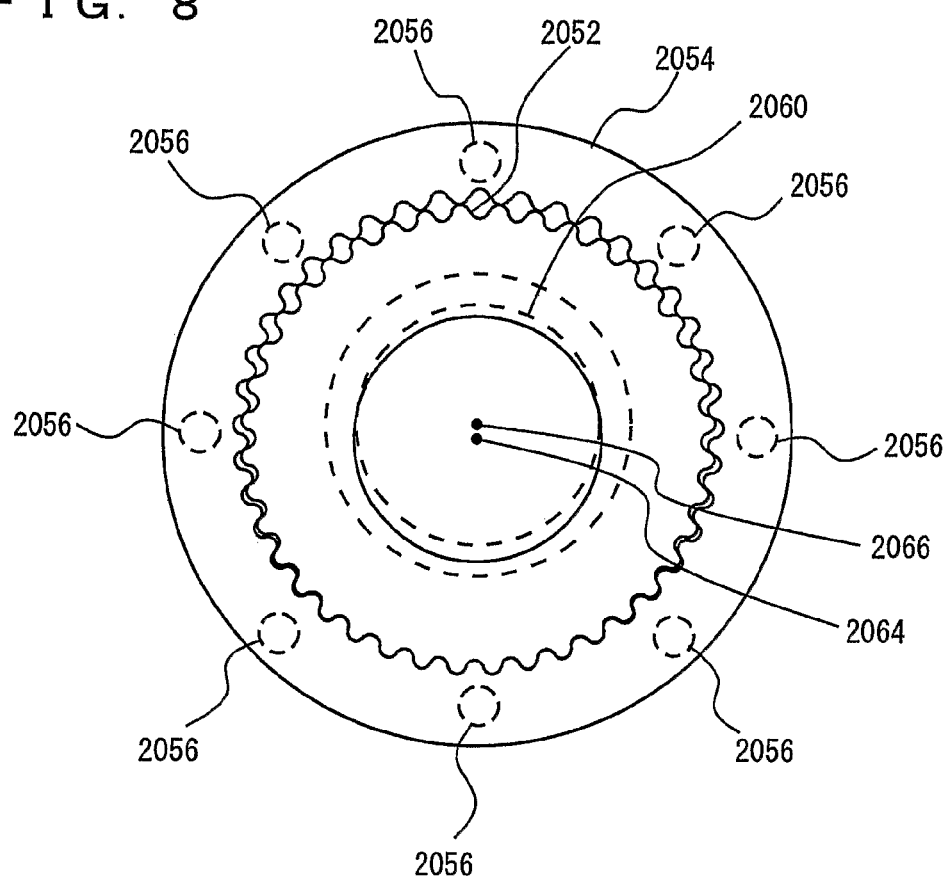
FIG. 8 is a cross section along D-D in FIG. 3.

FIG. 8 shows a cross section along D-D in FIG. 3. Inner teeth gear 2054 is provided such that a part of the teeth thereof meshes with outer teeth gear 2052. When the rotation speed of the output shaft of electric motor 2060 is identical to the rotation speed of sprocket 2010, coupling 2062 and inner teeth gear 2054 rotate at the same rotation speed as that of outer teeth gear 2052 (sprocket 2010). In this case, guide plate 2040 rotates at the same rotation speed as that of sprocket 2010 and accordingly the phase of intake valve 1100 is maintained.

When electric motor 2060 causes coupling 2062 to rotate about axial center 2064 and relative to outer teeth gear 2052, inner teeth gear 2054 as a whole accordingly revolves about axial center 2064 while inner teeth gear 2054 rotates about eccentric axis 2066. The rotational motion of inner teeth gear 2054 causes guide plate 2040 to rotate relative to sprocket 2010 and thus the phase of intake valve 1100 is changed.

The phase of intake valve 1100 is changed by reduction of the rotation speed of relative rotation between the output shaft of electric motor 2060 and sprocket 2010 (operation amount of electric motor 2060) by reduction gears 2050, guide plate 2040 and link mechanism 2030. Here, the rotation speed of relative rotation between the output shaft of electric motor 2060 and sprocket 2010 may be increased to change the phase of intake valve 1100. On the output shaft of electric motor 2060, a motor rotation angle sensor 5050 is provided, which outputs a signal indicating an angle of rotation (position of the output shaft in the rotating direction) of the output shaft. Motor rotation angle sensor 5050 is generally configured to generate a pulse signal every time the output shaft of electric motor rotates by a prescribed angle. Based on the output of motor rotation angle sensor 5050, the rotation speed of the output shaft of electric motor 2060 (hereinafter also simply referred to as rotation speed of electric motor 2060) can be detected.

Figure 9:
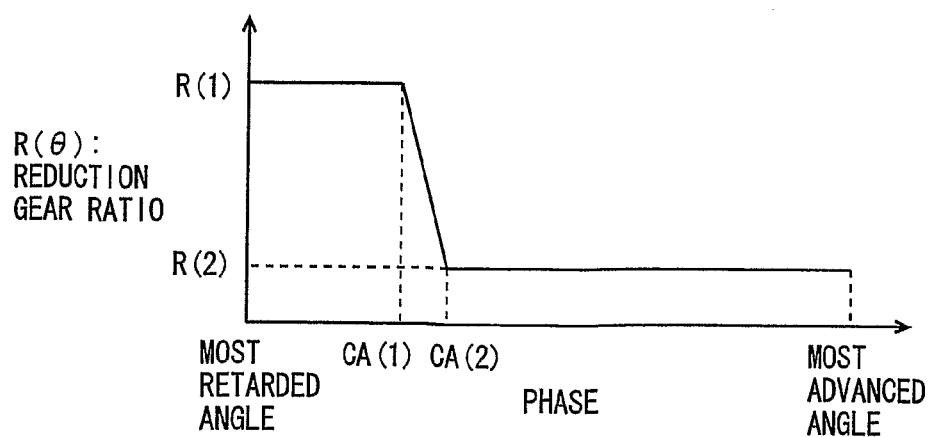
FIG. 9 shows the reduction gear ratio of the intake VVT mechanism as a whole.

As shown in FIG. 9, the reduction gear ratio R(θ) of intake VVT mechanism 2000 as a whole, that is, the ratio of rotation speed of relative rotation between the output shaft of electric motor 2060 and sprocket 2010 to the amount of phase-change, may have a value according to the phase of intake valve 1100. In the present embodiment, as the reduction gear ratio is higher, the amount of phase-change with respect to the rotation speed of relative rotation between the output shaft of electric motor 2060 and sprocket 2010 is smaller.

In the case where the phase of intake valve 1100 is in a first region from the most retarded angle to CA (1), the reduction gear ratio of intake VVT mechanism 2000 as a whole is R (1). In the case where the phase of intake valve 1100 is in a second region from CA (2) (CA (2) is advanced with respect to CA (1)) to the most advanced angle, the reduction gear ratio of intake VVT mechanism 2000 as a whole is R (2) (R (1)>R (2)).

In the case where the phase of intake valve 1100 is in a third region from CA (1) to CA (2), the reduction gear ratio of intake VVT mechanism 2000 as a whole changes at a predetermined rate of change ((R (2)-R (1))/(CA (2)-CA (1))).

Based on the configuration as described above, intake VVT mechanism 2000 of the variable valve timing apparatus of the present embodiment functions as described below.

Figure 10:
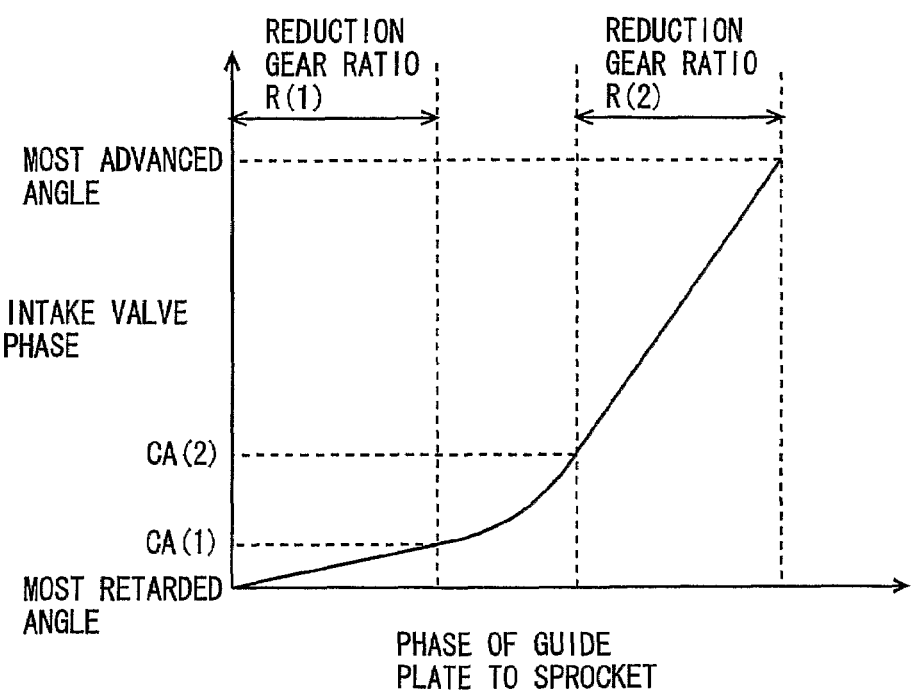
FIG. 10 shows a relation between the phase of a guide plate relative to a sprocket and the phase of an intake camshaft.

When the phase of intake valve 1100 (intake camshaft 1120) is to be advanced, electric motor 2060 is operated to rotate guide plate 2040 relative to sprocket 2010, thereby advancing the phase of intake valve 1100 as shown in FIG. 10.

When the phase of intake valve 1100 is in the first region between the most retarded angle and CA (1), the rotation speed of relative rotation between the output shaft of electric motor 2060 and sprocket 2010 is reduced at reduction gear ratio R (1) and the phase of intake valve 1100 is advanced.

In the case where the phase of intake valve 1100 is in the second region between CA (2) and the most advanced angle, the rotation speed of relative rotation between the output shaft of electric motor 2060 and sprocket 2010 is reduced at reduction gear ratio R (2) and the phase of intake valve 1100 is advanced.

When the phase of intake valve 1100 is to be retarded, the output shaft of electric motor 2060 is rotated relative to sprocket 2010 in the direction opposite to the direction when the phase thereof is to be advanced. As in the case of advancing the phase, when the phase is to be retarded and the phase of intake valve 1100 is in the first region between the most retarded angle and CA (1), the rotation speed of relative rotation between the output shaft of electric motor 2060 and sprocket 2010 is reduced at reduction gear ratio R (1) and the phase is retarded. Further, when the phase of intake valve 1100 is in the second region between CA (2) and the most advanced angle, the rotation speed of relative rotation between the output shaft of electric motor 2060 and sprocket 2010 is reduced at reduction gear ratio R (2) and the phase is retarded.

Accordingly, as long as the direction of the relative rotation between the output shaft of electric motor 2060 and sprocket 2010 is the same, the phase of intake valve 1100 can be advanced or retarded for both of the first region between the most retarded angle and CA (1) and the second region between CA (2) and the most advanced angle. Here, for the second region between CA (2) and the most advanced angle, the phase can be more advanced or more retarded. Thus, the phase can be changed over a wide range.

Further, since the reduction gear ratio is high for the first region between the most retarded angle and CA (1), a large torque is necessary, for rotating the output shaft of electric motor 2060 by a torque acting on intake camshaft 1120 as engine 1000 operates. Therefore, even if electric motor 2060 generates no torque as in the case where electric motor 2060 is stopped, rotation of the output shaft of electric motor 2060 caused by the torque acting on intake camshaft 1120 can be prevented. Therefore, a change of the actual phase from a phase determined under control can be restrained. Further, unintended change in phase can be prevented when power supply to electric motor 2060 as the actuator is stopped.

When the phase of intake valve 1100 is in the third region between CA (1) and CA (2), the rotation speed of relative rotation between the output shaft of electric motor 2060 and sprocket 2010 is reduced at a reduction gear ratio that changes at a predetermined rate of change, which may result in advance or retard in phase of intake valve 1100.

Accordingly, when the phase changes from the first region to the second region or from the second region to the first region, the amount of change of the phase with respect to the rotation speed of relative rotation between the output shaft of electric motor 2060 and sprocket 2010 can be increased or decreased gradually. In this way, a sudden stepwise change of the amount of change in phase can be restrained, to thereby restrain a sudden change in phase. Accordingly, phase controllability can be improved.

As discussed above, in the intake VVT mechanism for the variable valve timing apparatus in the present embodiment, when the phase of the intake valve is in the region from the most retarded angle to CA (1), reduction gear ratio of intake VVT mechanism 2000 as a whole is R (1). When the phase of the intake valve is in the region from CA (2) to the most advanced angle, the reduction gear ratio of intake VVT mechanism 2000 as a whole is R (2), which is lower than R (1). Thus, as long as the rotational direction of the output shaft of the electric motor is the same, the phase of the intake valve can be advanced or retarded for both of the regions, namely the first region between the most retarded angle and CA (1) and the second region between CA (2) and the most advanced angle. Here, for the second region between CA (2) and the most advanced angle, the phase can be advanced or retarded to a greater extent. Therefore, the phase can be changed over a wide range. Further, for the first region between the most retarded angle and CA (1), the reduction gear ratio is high and therefore, it is possible to prevent rotation of the output shaft of the electric motor by the torque acting on the intake camshaft as the engine is operated. Thus, a change of the actual phase from a phase determined under control can be restrained. Accordingly, the phase can be changed over a wide range and the phase can be controlled accurately.

Figure 11:
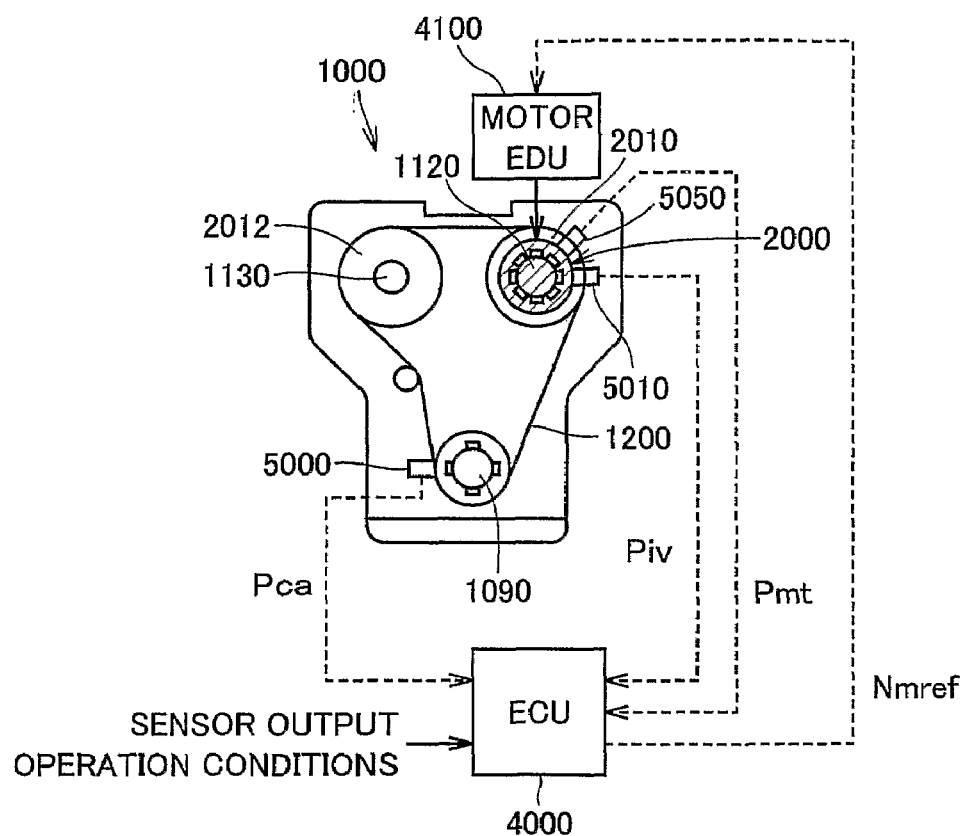
FIG. 11 is a schematic block diagram illustrating a control structure of intake valve phase by the variable valve timing apparatus in accordance with the present embodiment.

FIG. 11 is a schematic block diagram illustrating a control structure of intake valve phase by the variable valve timing apparatus in accordance with the present embodiment.

Referring to FIG. 11, as already described with reference to FIG. 1, engine 1000 is configured such that power from crankshaft 1090 is transmitted to intake camshaft 1120 and exhaust camshaft 1130 through sprockets 2010 and 2012, respectively, by means of a timing chain 1200 (or a timing belt). Further, on the outer circumferential side of intake camshaft 1120, a cam position sensor 5010 is attached, for outputting a cam angle signal Piv, at every prescribed cam angle. On the outer circumferential side of crankshaft 1090, a crank angle sensor 5000 is attached, for outputting a crank angle signal Pca, at every prescribed crank angle. Further, on a rotor (not shown) of electric motor 2060, a motor rotation angle sensor 5050 is attached, for outputting a motor rotation angle signal Pmt, at every prescribed rotation angle. The cam angle signal Piv, crank angle signal Pca and motor rotation angle signal Pint are input to ECU 4000.

Further, based on the outputs of sensors detecting the state of engine 1000 and on operation conditions (pedal operation of the driver, current vehicle speed and the like), ECU 4000 controls the operation of engine 1000 so that required output of engine 1000 can be attained. As a part of engine control, ECU 4000 sets phase target values of intake valve 1100 and exhaust valve 1110, based on the map shown in FIG. 2. Further, ECU 4000 generates a rotation speed command value Nmref of electric motor 2060 as the actuator of intake VVT mechanism 2000 such that the phase of intake valve 1100 reaches the target value (target phase). The rotation speed command Nmref is determined corresponding to the rotation speed of output shaft of electric motor 2060 relative to sprocket 2010 (intake camshaft 1120), as will be described later. The difference in rotation speed of electric motor 2060 relative to intake camshaft 1120 corresponds to the operation amount of actuator.

Motor EDU (Electronic Drive Unit) 4100 controls the rotation speed of electric motor 2060, in accordance with the rotation speed command Nmref from ECU 4000.

Figure 12:
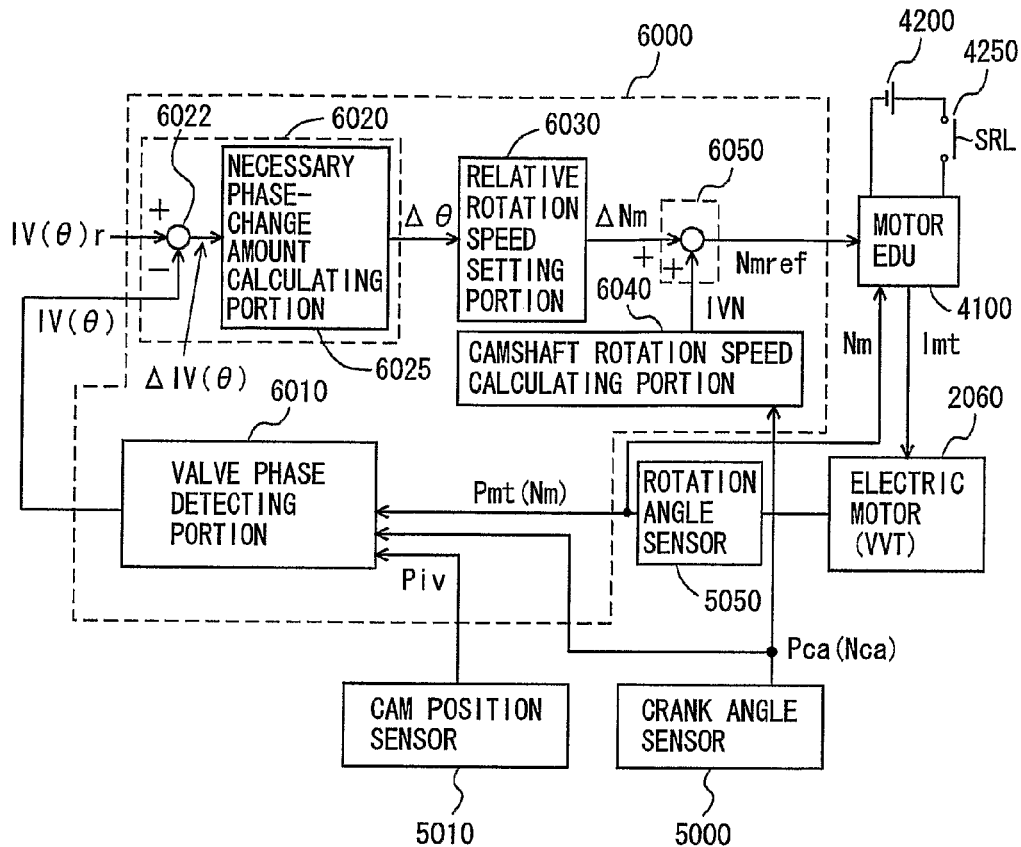
FIG. 12 is a block diagram illustrating rotation speed control of an electric motor as the actuator of the variable valve timing apparatus in accordance with the present embodiment.

FIG. 12 is a block diagram illustrating rotation speed control of electric motor 2060 as the actuator of intake VVT mechanism 2000 in accordance with the present embodiment.

Referring to FIG. 12, an actuator operation amount setting portion 6000 includes a valve phase detecting portion 6010, a camshaft phase-change amount calculating portion 6020, a relative rotation speed setting portion 6030, a camshaft rotation speed detecting portion 6040, and a rotation speed command generating portion 6050. The operation of actuator operation amount setting portion 6000 is realized by executing a control process in accordance with a prescribed program stored in advance in ECU 4000 at every prescribed control period.

Valve phase detecting portion 6010 calculates the current actual phase IV(θ) (hereinafter also denoted as actual intake valve phase IV(θ)) of intake valve 1100, based on crank angle signal Pca from crank angle sensor 5000, cam angle signal Piv from cam position sensor 5010 and motor rotation angle signal Pmt from rotation angle sensor 5050 of electric motor 2060.

Specifically, crank angle sensor 5000 of the present embodiment corresponds to the "first detecting means" of the present invention, cam position sensor 5010 corresponds to the "second detecting means" of the present invention, and motor rotation angle sensor 5050 corresponds to the "third detecting means" of the present invention. Detection of intake valve phase IV(θ) by valve phase detecting portion 6010 will be described in detail later.

Camshaft phase-change amount calculating portion 6020 has a calculating portion 6022 and a necessary phase-change amount calculating portion 6025. Calculating portion 6022 calculates deviation ΔIV(θ) of the actual intake valve phase IV(θ) from the target phase IV(θ)r (ΔIV(θ)=IV(θ)−IV(θ)r). Necessary phase-change amount calculating portion 6025 calculates the necessary amount of change Δθ of intake camshaft 1120 of this control period, in accordance with the deviation ΔIV(θ) calculated by calculating portion 6022.

By way of example, the maximum value of phase-change amount Δθ in a single control period is set in advance, and necessary phase-change amount calculating portion 6025 determines the phase-change amount Δθ in accordance with the deviation ΔIV(θ) within the range up to the maximum value. Here, the maximum value may be a prescribed fixed value, or it may be variably set by necessary phase-change amount calculating portion 6025 in accordance with the state of operation (rotation speed, amount of intake air and the like) of engine 1000 or the magnitude of deviation ΔIV(θ).

Relative rotation speed setting portion 6030 calculates relative rotation speed ΔNm of the output shaft of electric motor 2060 relative to the rotation speed of sprocket 2010 (intake camshaft 1120). By way of example, the relative rotation speed ΔNm is set to a positive value (ΔNm>0) when the intake valve phase is to be advanced, set to a negative value (ΔNm<0) when the intake valve phase is to be retarded, and set to approximately zero (ΔNm=0) when the current intake valve phase is to be maintained (Δθ=0).

Here, the relation between the phase-change amount Δθ per unit time ΔT corresponding to the control period and the relative rotation speed ΔNm is represented by the following expression (1). In expression (1), R(θ) represents reduction gear ratio that changes in accordance with the intake valve phase, shown in FIG. 9.

$$\Delta\theta \propto \Delta Nm \cdot 360° \cdot (1/R(\theta)) \cdot \Delta T \quad (1)$$

Therefore, relative rotation speed setting portion 6030 may calculate the relative rotation speed ΔNm of electric motor 2060 for generating the camshaft phase-change amount Δθ required in control period ΔT, in accordance with an operation of expression (1).

Camshaft rotation speed detecting portion 6040 calculates the rotation speed of sprocket 210, that is, the actual rotation speed IVN of intake camshaft 1120 as one-half the rotation speed of crankshaft 1090. Camshaft rotation speed detecting portion 6040 may be configured to calculate the actual rotation speed IVN of intake camshaft 1120 based on the cam angle signal Piv from cam position sensor 5010. Generally, however, the number of cam angle signal output per one rotation of intake camshaft 1120 is smaller than the number of crank angle signal output per one rotation of crankshaft 1090. Therefore, by detecting the camshaft rotation speed IVN based on the rotation speed of crankshaft 1090, detection accuracy can be improved.

Rotation speed command generating portion 6050 adds the actual rotation speed IVN of intake camshaft 1120 detected by camshaft rotation speed detecting portion 6040 and the relative rotation speed ΔNm set by relative rotation speed setting portion 6030, to generate rotation speed command value Nmref of electric motor 2060. The rotation speed command value Nmref generated by rotation speed command value generating portion 6050 is transmitted to motor EDU 4100.

Motor EDU 4100 is connected to a power source 4200 through a relay circuit 4250. On/off of relay circuit 4250 is controlled by a control signal SRL. Generally, power source 4200 is formed by a secondary battery that can be charged when the engine operates. Therefore, by turning off the relay circuit 4250 in response to control signal SRL, power supply to electric motor 2060 can be stopped. Further, control for stopping power supply to electric motor 2060 may be executed by motor EDU 4100.

Motor EDU 4100 controls electric motor 2060 such that the rotation speed of electric motor 2060 matches the rotation speed command value Nmref. By way of example, motor EDU 4100 controls switching of a power semiconductor device (such as a transistor) such that the power supplied to electric motor 2060 (as represented by motor current Imt) is controlled in accordance with deviation in rotation speed (Nref−Nm) of actual rotation speed Nm of electric motor 2060 from the rotation speed command value Nmref. Specifically, the duty ratio of switching operation of such power semiconductor device is controlled. Even when the relay circuit 4250 is on, power supply may be stopped by the control of motor EDU 4100, by stopping switching operation (off-fixed) of the power semiconductor device forming an inverter, a converter or the like in motor EDU 4100.

By way of example, in a configuration in which rotation speed command value Nmref is indicated by a pulse signal having a frequency in proportion to the rotation speed command value Nmref to motor EDU 4100, a prescribed range of normally used rotation speed command value Nmref is set in advance, and when an instruction is to be given to motor EDU 4100 to stop power supply to electric motor 2060, the frequency of the pulse signal may be set outside the prescribed range. By such an approach, it becomes possible to give an instruction to stop power supply to motor EDU 4100 without increasing the number of signals.

Particularly, in order to improve motor controllability, motor EDU 4100 controls duty ratio DTY as the amount of adjustment in rotation speed control in accordance with the following equation (2).

$$DTY=DTY(ST)+DTY(FB) \quad (2)$$

In Equation (2), DTY(FB) is a feedback term based on the deviation in rotation speed mentioned above and a control operation (typically, general P control, PI control or the like) with a prescribed control gain.

In Equation (2), DTY(ST) is a preset term set based on the rotation speed command value Nmref of electric motor 2060 and the set relative rotation speed ΔNm.

Figure 13:
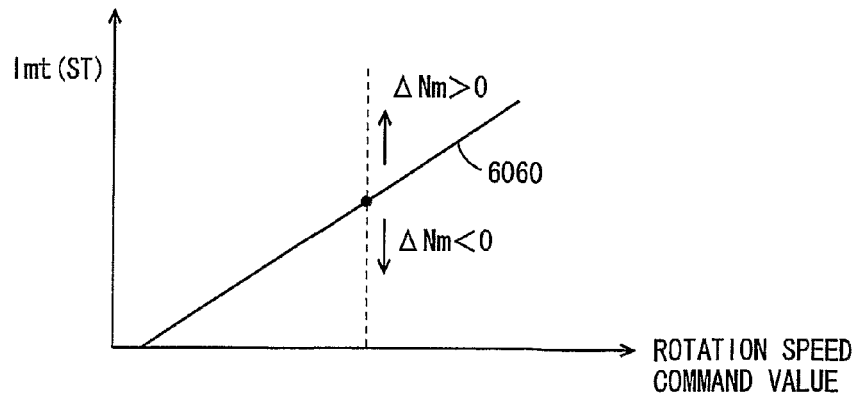
FIG. 13 is a schematic diagram representing speed control of the electric motor.

Referring to FIG. 13, duty ratio characteristic 6060 corresponding to the motor current value required when relative rotation speed ΔNm=0, that is, when electric motor 2060 is to be rotated at the same rotation speed as that of sprocket 2060 with respect to rotation speed command value Nmref (ΔNm=0), is set in advance as a table. Then, DTY(ST) in Equation (2) is set by relative addition/subtraction of a current value corresponding to the relative rotation speed ΔNm to/from the reference value in accordance with duty ratio characteristic 6060. By such rotation speed control that the power supply to electric motor 2060 is controlled by the combination of preset term and feedback term, motor EDU 4100 allows the rotation speed of electric motor 2060 to quickly follow any change in rotation speed command value Nmref, as compared with the rotation speed control simply by the term DTY(FB) of Equation (2).

Here, in order to realize accurate valve timing control by intake VVT mechanism 2000 through rotation speed control of electric motor 2060, it is necessary to accurately detect the actual phase of intake valve.

In this regard, generally, the actual intake valve phase is detected based on crank angle signal Pca and cam angle signal Piv. Specifically, at the time when cam angle signal Piv is generated, time difference of cam angle signal Piv from the generation of crank angle signal Pca is converted to rotation phase difference between crankshaft 1090 and intake camshaft 1120, whereby the current phase of intake camshaft 1120, that is, the actual intake valve phase is calculated (first phase calculating method).

Here, according to the first phase calculating method, it is difficult to ensure phase detection accuracy in a range where the engine speed (that corresponds to the rotation speed of crankshaft 1090 and intake camshaft 1120) is unstable, specifically, the range of relatively low rotation speed (for example, in the range where the rotation speed is lower than 1000 rpm).

In contrast, by intake VVT mechanism 2000 in accordance with the embodiment of the present invention, it is possible to accurately trace the phase-change amount of intake valve based on the operation amount (relative rotation speed ΔNm) of electric motor 2060 as the actuator. Specifically, based on the outputs of various sensors, the actual relative rotation speed ΔNm is calculated, and by an operation in accordance with expression (1) based on the calculated actual relative rotation speed ΔNm, the amount of change dIV(θ) of the actual intake valve phase per unit time (control period) can be calculated. By accumulating the amount of change dIV(θ) of the actual phase, the current phase of intake camshaft 1120, that is, the actual intake valve phase, can successively be calculated (second phase calculating method).

The second phase calculating method, however, requires execution of operation for calculating the actual relative rotation speed ΔNm and the amount of change dIV(θ) of the actual intake valve phase in every control period, resulting in increased computational load. This may lead to increased cost, for example, for applying a processor capable of high-speed, large-volume processing.

Further, in the range of low engine speed, the interval of cam angle signal generation becomes long, and therefore, frequency of phase calculation decreases. Therefore, in the first phase calculating method, it becomes difficult to ensure phase detection accuracy. On the other hand, in the range of high engine speed where the interval of cam angle signal generation becomes short, phase detection with relatively high accuracy is possible by the first phase calculating method. Namely, the range of engine speed has an influence on the phase detection accuracy.

Figure 14:
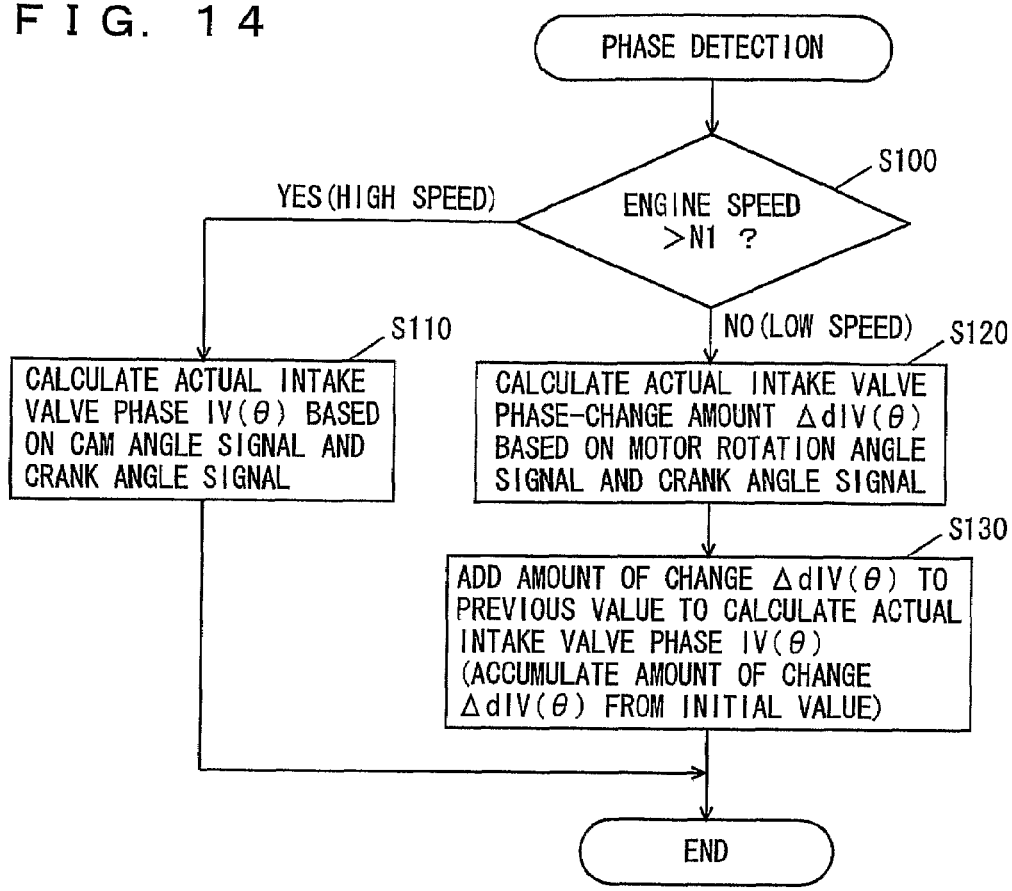
FIG. 14 is a flowchart representing a first example of detecting an actual intake valve phase, in the variable valve timing apparatus in accordance with an embodiment of the present invention.

Therefore, in the variable valve timing apparatus in accordance with an embodiment of the present invention, the phase calculating method is switched dependent on the engine speed, in accordance with the flowchart of FIG. 14, to detect the actual intake valve phase. The phase detection of intake valve in accordance with the flowchart of FIG. 14 is executed by valve phase detecting portion 6010 (FIG. 12) in every control period, as a part of valve timing control by intake VVT mechanism 2000.

Referring to FIG. 14, at step S100, valve phase detecting portion 6010 determines whether the engine speed is higher than a prescribed rotation speed N1 or not, based on crank angle signal Pca from crank angle sensor 5000. The prescribed rotation speed N1 is set, for example, to about 1000 (rpm).

When the engine speed is higher than the prescribed rotation speed N1 (determination of YES at step S100), valve phase detecting portion 6010 actually finds the relative relation of rotation angles between intake camshaft 1120 and crankshaft 1090 at step S110 based on the cam angle signal and the crank angle signal, and whereby calculates the actual intake valve phase IV(θ) corresponding to the difference in rotational phase between the two. This operation corresponds to the first phase calculating method described above.

On the contrary, when the engine speed is not higher than the prescribed rotation speed N1 (determination of NO at step S100), valve phase detecting portion 6010 calculates the actual intake valve phase IV(θ) based on the operation amount of the actuator (electric motor 2060), in accordance with the second phase calculating method described above, at steps S120 and S130.

At step S120, valve phase detecting portion 6010 detects the actual relative rotation speed ΔNm of electric motor 2060 with respect to the rotation speed of sprocket 2010 (intake camshaft 1120). By way of example, as will be described later, the actual relative rotation speed ΔNm may be calculated based on the frequency divided signal of the crank angle signal and on the motor rotation angle signal.

Figure 15:
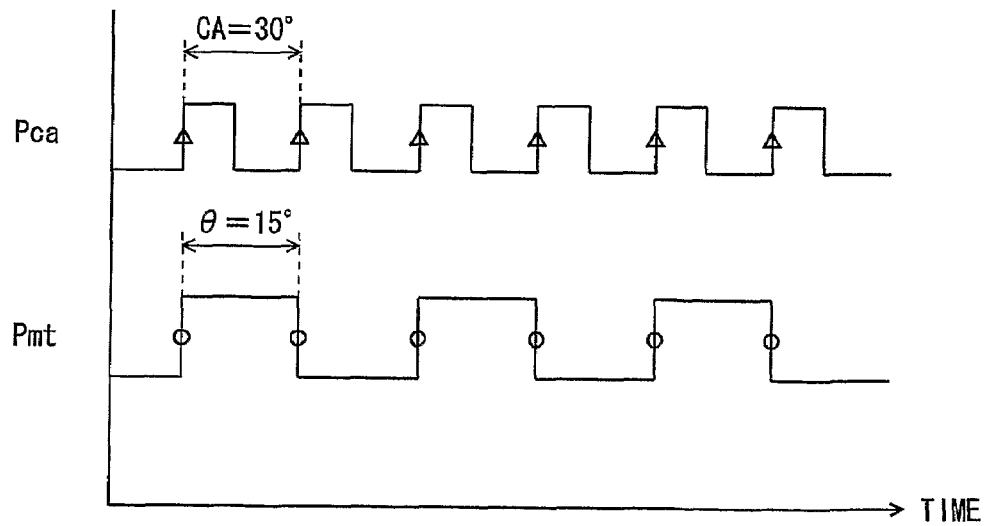
FIG. 15 is a diagram of waveforms showing a method of detecting relative rotation speed of an electric motor.

As shown in FIG. 15, rotation angle sensor 5050 generates a motor rotation angle signal Pmt such that level transition from H level to L level or from L level to H level occurs every time the rotor of electric motor 2060 rotates by 15°. Here, by frequency division of crank angle signal Pca that corresponds to motor rotation angle signal Pmt, crank angle frequency divided signal Pca# is generated such that it is generated every time crankshaft 1090 rotates by 30°.

By providing a counter (not shown) that increments (+1) a count value every time a level transition of motor rotation angle signal Pmt occurs and decrements (−1) the count value every time crank angle frequency divided signal Pca# is generated, the actual relative rotation speed ΔNm can be calculated, based on the count value, in each control period.

Further, based on a product of the relative rotation speed ΔNm obtained in the above-described manner and the reduction gear ratio R(θ) obtained by making a reference to the table storing in advance the reduction gear ratio R(θ) corresponding to the intake valve phase as shown in FIG. 9, using the current actual intake valve phase as an augment, the amount of change dIV(θ) of the actual intake valve phase in each control period can be calculated.

At step S130, valve phase detecting portion 6010 calculates the current actual intake valve phase IV(θ), by adding the amount of change dIV(θ) calculated at step S120 to the actual intake valve phase IV(θ) of the previous control period.

In this manner, even in the range of low engine speed where it is difficult to ensure high phase detection accuracy by the first phase calculating method based on the crank angle signal and cam angle signal, the actual intake valve phase IV(θ) can be detected accurately by the second phase calculating method using successive accumulation of phase-change amount in accordance with the actuator operation amount by intake VVT mechanism 2000. In the range of high engine speed where the accuracy of phase detection can easily be attained by the first phase calculating method described above, operation by the second phase calculating method is stopped, and the actual intake valve phase IV(θ) is detected by the first phase calculating method. In this manner, in accordance with the variation in engine speed, actual intake valve phase IV(θ) is detected accurately without excessively increasing computational load of ECU 4000, and thus, accurate control of the timing of opening/closing intake valve 1100 is realized.

Figure 16:
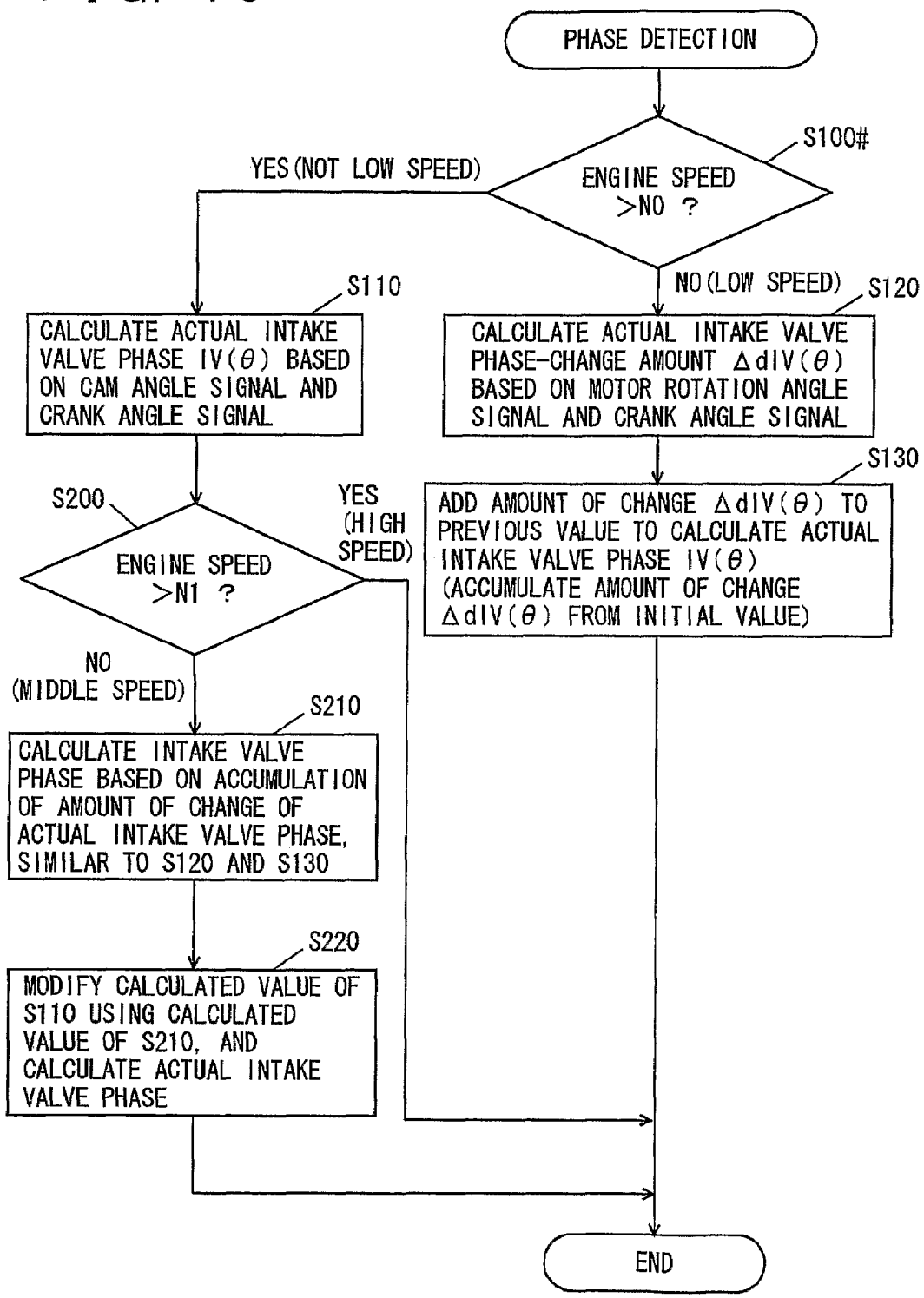
FIG. 16 is a flowchart representing a second example of detecting an actual intake valve phase, in the variable valve timing apparatus in accordance with an embodiment of the present invention.

In order to ensure phase detection accuracy at the range where the phase calculating method is switched, the actual intake valve phase may be detected in accordance with the flowchart shown in FIG. 16.

Referring to FIG. 16, according to another example of detecting actual intake valve phase by the variable valve timing apparatus in accordance with an embodiment of the present invention, at step S100#, valve phase detecting portion 6010 determines whether the current engine speed is higher than a prescribed rotation speed N0 or not. Here, the prescribed rotation speed N0 is set lower than the prescribed rotation speed N1 at step S100, and it is set to about 400 (rpm).

According to the flowchart shown in FIG. 16, valve phase detecting portion 6010 determines that it is in the "range of low rotation speed" when the engine speed <N0 (determination of NO at step S100#), and calculates the actual intake valve phase IV(θ) by successive accumulation of phase-change amount in accordance with the actuator operation amount of intake VTT mechanism 2000 through the process of steps S120 and S130 similar to those of FIG. 14 (second phase calculating method).

On the contrary, when engine speed ≧N0 (determination of YES at step S100#), intake valve phase detecting portion 6010 calculates the actual intake valve phase IV(θ) based on the crank angle signal and cam angle signal (first phase calculating method) by the process of step S110 similar to that of FIG. 14, and further executes the process of steps S200 to S220.

At step S200, valve phase detecting portion 6010 determines whether the engine speed is higher than the prescribed rotation speed N1, which is the same as that of step S100. When the engine speed is higher than the prescribed rotation speed N1 (determination of YES at step S200), valve phase detecting portion 6010 determines that it is in the "range of high rotation speed", and determines the actual intake valve phase IV(θ)a calculated at step S110 to be the final detection value (that is, IV(θ)=IV(θ)a).

When the determination at step S200 is NO, that is, when N0<engine speed≦N1, valve phase detecting portion 6010 determines that it is in the "range of middle rotation speed" and, at step S210, calculates the actual intake valve phase IV(θ)b by accumulation of phase-change amount in accordance with the actuator operation amount of intake VTT mechanism 2000 through the process similar to steps S120 and S130 (second phase calculating method).

Then, using the value IV(θ)b obtained at step S210, valve phase detecting portion 6010 modifies the value IV(θ)a calculated at step S110 as needed, to calculate the final actual intake valve phase IV(θ) (step S220). By way of example, the actual intake valve phase IV(θ) in the range of middle rotation speed is calculated in accordance with Equation (3) below.

$$IV(\theta)=(1-k)\cdot IV(\theta)a+k\cdot IV(\theta)b \quad (3)$$

where k is a modification coefficient (k<1.0), and the modification coefficient k may be a fixed value or may be a variable value in accordance with deviation |IV(θ)a−IV(θ)b| of the calculated values obtained by these two phase calculating methods.

By such phase detection of intake valve 1100, the phase calculating method is switched between the ranges of high rotation speed and low rotation speed in the similar manner as that of FIG. 14, and the accuracy of phase detection in the border range between the two (range of middle rotation speed) can be improved.

(Measure for Sensor Failure of Electric Motor)

When a sensor detecting the actuator operation amount, specifically, rotation angle sensor 5050 of electric motor 2060 fails, calculation of actual intake valve phase IV(θ) by valve phase detecting portion 6010 would be impossible. A measure for such sensor failure will be described in the following.

Figure 17:
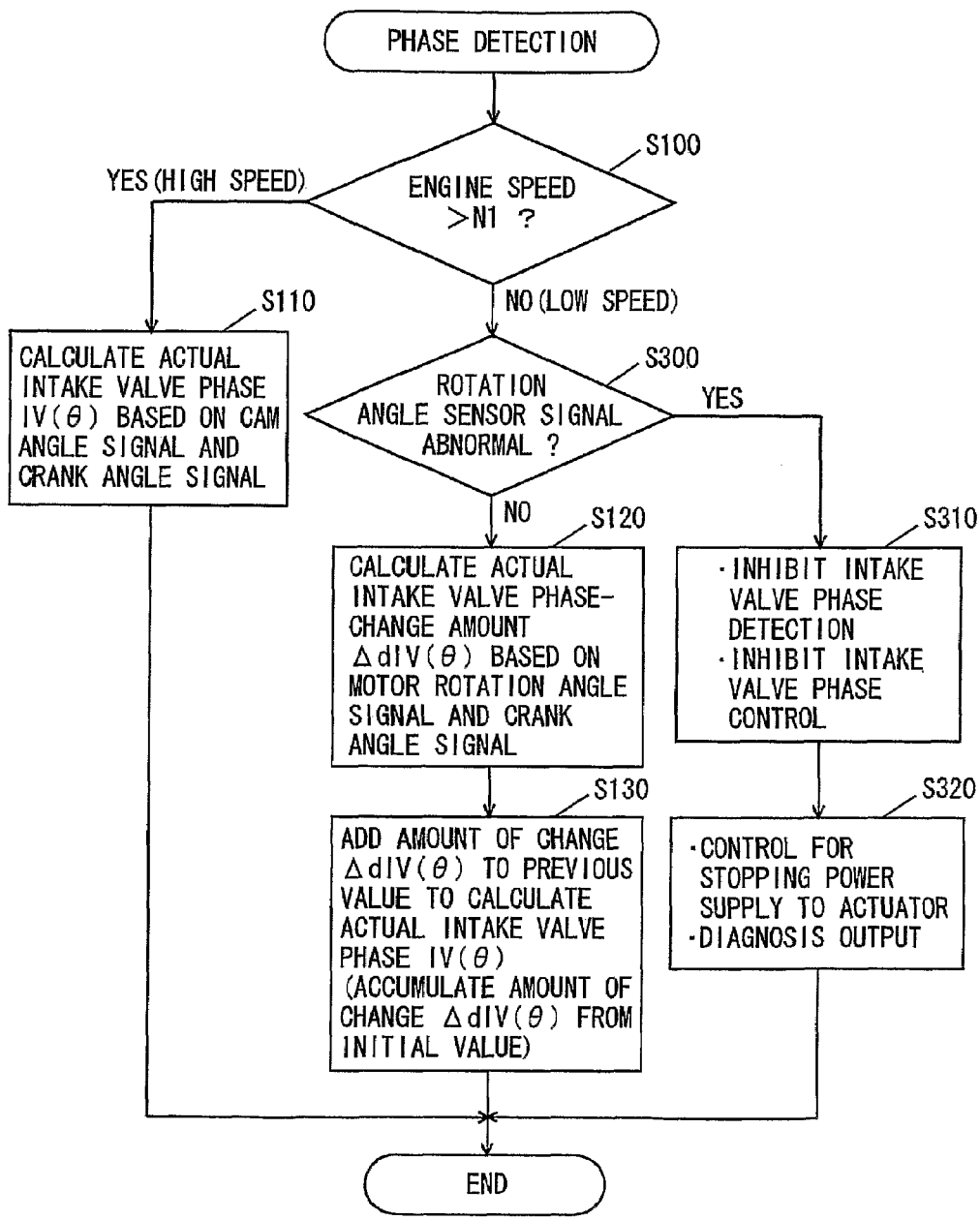
FIG. 17 is a flowchart representing a process at the time of sensor failure in detecting the intake valve phase shown in FIG. 14.

FIG. 17 shows a flowchart representing the measure for sensor failure during detection of actual intake valve phase shown in FIG. 14.

Detection of actual intake valve phase shown in FIG. 17 includes, as compared with the flowchart of FIG. 14, additional steps S300 to S320.

When determination at step S100 is NO, that is, when the engine speed is not higher than the prescribed rotation speed N1, valve phase detecting portion 6010 executes step S300 prior to the process of calculating actual intake valve phase IV(θ) in accordance with the second phase calculating method described above through steps S120 and S130.

At step S300, valve phase detecting portion 6010 determines whether detection of actuator operation amount is abnormal or not, based on whether the motor rotation angle signal Pmt from rotation angle sensor 5050 is abnormal or not. As shown in FIG. 15, motor rotation angle signal Pmt is a pulse signal corresponding to the rotation of rotor in electric motor 2060 when it is normal. Therefore, determination at S300 may be done by detecting an abnormal state in which the signal level is kept unchanged for a period longer than a prescribed period in accordance with the rotation speed command Nmref of electric motor 2060 (in which transition does not occur from the L or H level). Such an abnormal state may be detected by motor EDU 4100 and the result of detection may be transmitted to ECU 4000 (valve phase detecting portion 6010). Alternatively, a fail signal alarming occurrence of failure from rotation angle sensor 5050 itself may be received and reflected on the determination of step S300.

Only when determination at step S300 is NO (that is, when the signal from rotation angle sensor 5050 is normal), valve phase detecting portion 6010 executes calculation of actual intake valve phase IV(θ) based on the actuator operation amount in accordance with the second phase calculating method.

If it is in the range of low engine speed and the determination at step S300 is YES (that is, when the signal from rotation angle sensor 5050 is abnormal), the actuator operation amount cannot be obtained, and hence, the actual intake valve phase IV(θ) cannot accurately be known. Therefore, valve phase detecting portion 6010 stops detection of the intake valve phase at step S310, and thereafter, inhibits control of intake valve phase.

Further, at step S320, power supply to electric motor 2060 as the actuator is stopped. As described above, by setting control signal SRL to turn off relay circuit 4250, or by controlling motor EDU 4100 to stop power supply to electric motor 2060, power supply to electric motor 2060 is stopped. As a result, operation of motor 2060 in a state where the rotation speed is unknown is avoided, for device protection.

When power supply is stopped and electric motor 2060 stops its operation accordingly, change in intake valve phase also stops if the engine is stopped (rotation speed of sprocket 2010 is also zero). When the engine is operating and electric motor 2060 stops, relative rotation speed of sprocket 2010 to electric motor 2060 becomes negative, and the intake valve phase gradually changes to the retarded side. Finally, it reaches the most retarded position. Therefore, even if intake valve phase control is inhibited, combustion conditions for engine 1000 can generally be set to the safe combustion side.

Further, at step S320, valve phase detecting portion 6010 generates an alarm (diagnosis monitor or the like) to the driver urging inspection of VVT mechanism (variable valve timing apparatus). Particularly, one of diagnosis codes as information for specifying contents of failure detected by failure diagnosis may be defined to indicate that "in variable valve timing apparatus, sensor for electric motor as an actuator failed," so that the diagnosis code may be stored together in the process of step S320. This facilitates proper maintenance at the time of inspecting VVT mechanism.

As the phase of intake valve 1100 is detected in the above-described manner, if detection of actuator operation amount is abnormal (typically in the case of sensor failure of electric motor) in such a range of engine speed (range of low engine speed) that the actual valve timing is detected based on the actuator operation amount, it is possible to prevent abnormal control of valve timing resulting from erroneous detection of valve timing. Further, motor 2060 as the actuator can be protected.

Figure 18:
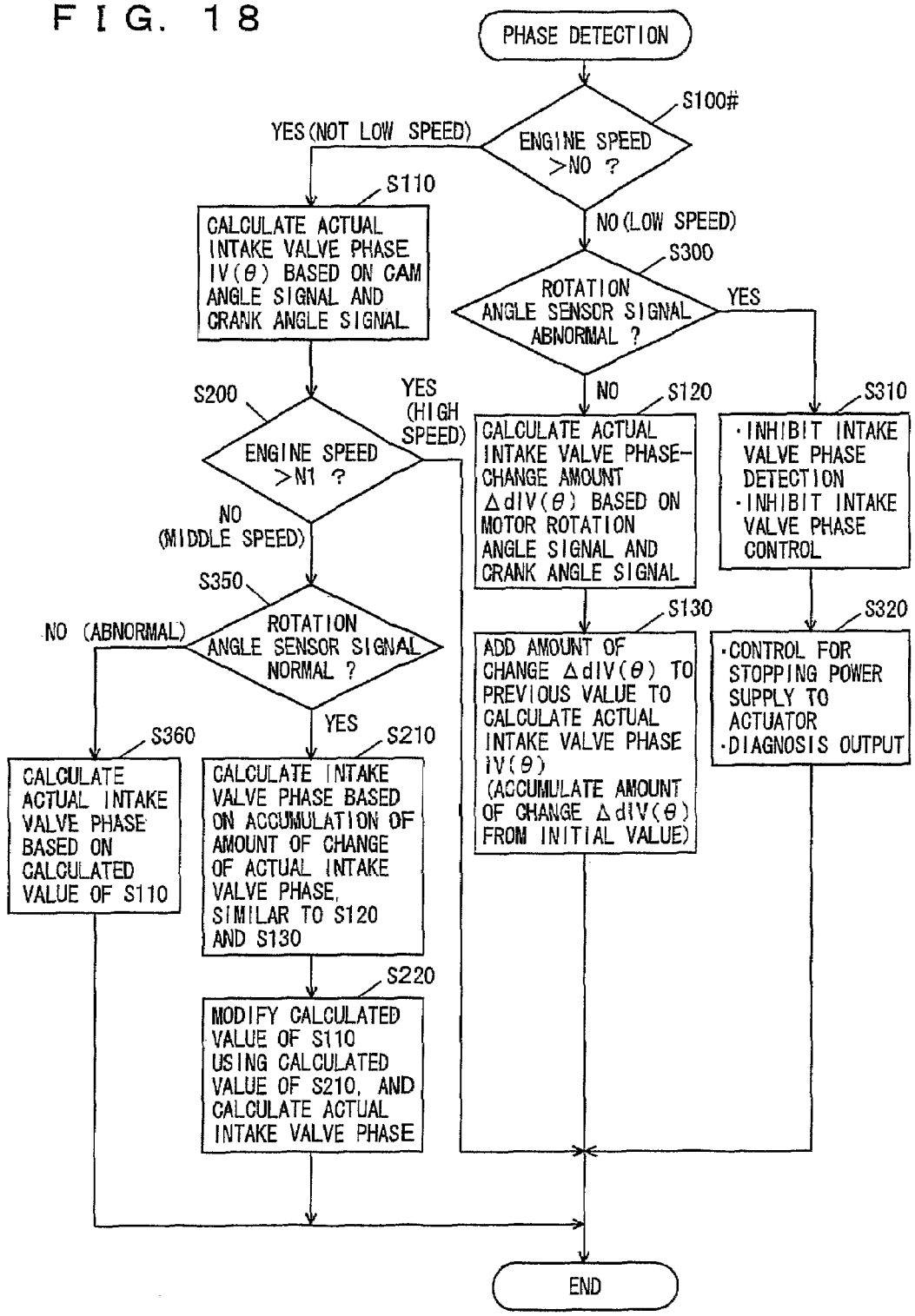
FIG. 18 is a flowchart representing a process at the time of sensor failure in detecting the intake valve phase shown in FIG. 16.

FIG. 18 shows a flowchart representing a measure for sensor failure in detecting the actual intake valve phase shown in FIG. 16.

The detection of actual intake valve phase shown in FIG. 18 includes, as compared with the flowchart of FIG. 16, additional steps S300 to S320 and S350, S360.

When the determination at step S100# is NO, valve phase detecting portion 6010 executes the process following step S300 in the similar manner as in the flowchart of FIG. 17. Specifically, in the range of low engine speed where the actual valve timing is detected based on the actuator operation amount, valve phase detecting portion 6010 prevents abnormal valve timing control based on the erroneous valve timing detection, when detection of actuator operation amount is abnormal (typically in the case of sensor failure of the electric motor).

When the determination at step S100# is YES, valve phase detecting portion 6010 executes steps S110 and S200 as in FIG. 16, and at step S200, determines whether the engine speed is in the high speed range or middle speed range.

When it is in the range of high engine speed (determination of YES at step S200), the process is the same as the flowchart of FIG. 16, and therefore, description thereof will not be repeated.

When the determination at step S200 is NO, that is, in the range of middle engine speed, valve phase detecting portion 6010 executes step S350 before the process of calculating actual intake valve phase IV(θ) of steps S210 and S220 shown in FIG. 16.

At step S350, valve phase detecting portion 6010 determines whether the detection of actuator operation amount is normal or not based on whether motor rotation angle signal Pmt from rotation angle sensor 5050 is normal or not. The determination at step S350 may be done in accordance with the same procedure as at step S300 and taking an inverse logic thereof.

Only when the determination at step S350 is YES (that is, when the signal from rotation angle sensor 5050 is normal), valve phase detecting portion 6010 executes calculation of actual intake valve phase IV(θ) such that the value calculated in accordance with the first phase calculating method is modified by the value calculated in accordance with the second phase calculating method as needed.

When the operation is in the range of middle engine speed and the determination at step S350 is NO (that is, when the signal from rotation angle sensor is abnormal), it becomes impossible to grasp the actuator operation amount, and therefore it becomes impossible to properly execute the second phase calculating method described above. Therefore, in such a situation, valve phase detecting portion 6010 calculates, at step S360, the intake valve phase IV(θ) using the value calculated based on the relative relation of rotation angles between intake cam shaft 1120 and crank shaft 1090 at step S110, without using the value of phase calculation based on the actuator operation amount.

In the range of middle engine speed, it is possible to continue calculation of actual intake valve phase IV(θ) even when rotation angle sensor 5050 is abnormal. Therefore, detection of the intake valve phase is not stopped. It is not preferable from the viewpoint of device protection, however, to continue operation of motor 2060 while the rotation speed cannot be known. Therefore, it is desirable, following the process of step S360, to inhibit control of intake valve phase and to execute the process of stopping power supply to electric motor 2060 and the process of outputting diagnosis, as at step S320.

By the phase detection of intake valve 1100 in the manner as described above, effects similar to those of FIG. 17 can be attained, and in the range of middle engine speed, when detection of actuator operation amount becomes abnormal (typically in the case of sensor failure), deterioration of phase detection accuracy resulting from the abnormal detection value can be prevented.

In the embodiment described above, valve phase detecting portion 6010 (FIG. 12) corresponds to the "phase detecting means" of the present invention, step S110 corresponds to the "first calculating means" of the present invention, and steps S120 and S130 correspond to the "second calculating means" of the present invention. Further, step S100 or S100# corresponds to the "first selecting means" of the present invention, step S200 corresponds to the "second selecting means" of the present invention, and step S220 (FIG. 16) corresponds to the "third calculating means" of the present invention. Further, step S310 (FIGS. 17, 18) corresponds to the "abnormality processing means" of the present invention, step S320 (FIGS. 17, 18) corresponds to the "power supply stopping means" of the present invention and step S360 (FIG. 18) corresponds to the "fourth calculating means" of the present invention.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A variable valve timing apparatus for changing a timing of opening/closing at least one of an intake valve and an exhaust valve provided in an engine, comprising:
    an actuator;
    a changing mechanism for changing the opening/closing timing, by changing difference in rotation phase of a camshaft driving the valve, of which opening/closing timing is to be changed, from rotation phase of a crankshaft by an amount of change in accordance with an operation amount of said actuator;
    first detecting means for detecting a rotation angle of said crankshaft;
    second detecting means for detecting a rotation angle of said camshaft;
    third detecting means for detecting the operation amount of said actuator; and
    phase detecting means for detecting actual opening/closing timing of said valve of which opening/closing timing is to be changed, based on outputs of said first to third detecting means,
    said phase detecting means including
    first calculating means for calculating said actual opening/closing timing based on a relative relation between the rotation angle of said crankshaft and the rotation angle of said camshaft,
    second calculating means for calculating said actual opening/closing timing based on an accumulation of amount of change of said difference in rotation phase of said camshaft in accordance with the operation amount of said actuator,
    first selecting means for selecting one of said first and second calculating means dependent on engine speed, for detecting said actual opening/closing timing,
    second selecting means for selecting both said first calculating means and said second calculating means for detecting said actual opening/closing timing, in a prescribed range of engine speed,
    third calculating means for calculating said actual opening/closing timing by modifying a value calculated by said first calculating means by a value calculated by said second calculating means, in said prescribed range of engine speed, and
    fourth calculating means for calculating said actual opening/closing timing, based on the value calculated by said first calculating means, without using the value calculated by said second calculating means, when abnormality occurs in said third detecting means in said prescribed range of engine speed.

2. The variable valve timing apparatus according to claim 1, wherein
    said first selecting means selects said first calculating means when said engine speed is higher than said prescribed range, and selects said second calculating means when said engine speed is lower than said prescribed range.

3. The variable valve timing apparatus according to claim 1, further comprising
    abnormality processing means for stopping, when abnormality occurs in said third detecting means while engine speed is in the range in which said first selecting means selects said second calculating means, detection of said actual opening/closing timing and for inhibiting a change of said opening/closing timing by said actuator.

4. The variable valve timing apparatus according to claim 3, further comprising
    power supply stopping means for stopping power supply to said actuator, when the change of said opening/closing timing is inhibited by said abnormality processing means.

5. The variable valve timing apparatus according to claim 1, wherein
    said actuator is formed of a motor, and operation amount of said actuator is difference in rotation speed of said motor relative to said camshaft;
    said changing mechanism changes said opening/closing timing such that ratio of amount of change of said opening/closing timing to the operation amount of said actuator differs and direction of change of said opening/closing timing is the same, when said opening/closing timing is in a first region and when it is in a second region; and
    said second calculating means has
    means for calculating amount of change of said actual opening/closing timing, based on correspondence between said opening/closing timing and said ratio obtained in advance and on the relative difference in rotation speed of said motor, and
    means for calculating said actual opening/closing timing at present by adding the calculated amount of change to said actual opening/closing timing calculated last time.

6. The variable valve timing apparatus according to claim 1, wherein
    said actuator is formed of a motor, and operation amount of said actuator is difference in rotation speed of said motor relative to said camshaft;
    said variable valve timing apparatus further comprising
    command value setting means for setting a rotation speed command value of said motor in accordance with the relative difference in rotation speed of said motor corresponding to required amount of change of said opening/closing timing, and
    motor control means for controlling rotation speed of said motor in accordance with said rotation speed command value by said command value setting means; and
    said motor control means controls power supply to said motor by a combination of setting control based on said rotation speed command value set by said command value setting means and said relative difference in rotation speed of said motor, and feedback control based on deviation of actual rotation speed from said rotation speed command value.

7. A variable valve timing apparatus for changing a timing of opening/closing at least one of an intake valve and an exhaust valve provided in an engine, comprising:
an actuator;
a changing mechanism for changing the opening/closing timing, by changing difference in rotation phase of a camshaft driving the valve, of which opening/closing timing is to be changed, from rotation phase of a crankshaft by an amount of change in accordance with an operation amount of said actuator;
a first detector detecting a rotation angle of said crankshaft;
a second detector detecting a rotation angle of said camshaft;
a third detector detecting the operation amount of said actuator; and
a controller for detecting actual opening/closing timing of said valve of which opening/closing timing is to be changed, based on outputs of said first to third detectors; wherein
said controller is configured to select at least one of a first calculating operation for calculating said actual opening/closing timing based on a relative relation between the rotation angle of said crankshaft and the rotation angle of said camshaft and a second calculating operation for calculating said actual opening/closing timing based on an accumulation of amount of change of said difference in rotation phase of said camshaft in accordance with the operation amount of said actuator, dependent on engine speed, for detecting said actual opening/closing timing,
said controller is further configured to perform both said first calculating operation and said second calculating operation in a prescribed range of engine speed, and to calculate said actual opening/closing timing by modifying a value calculated by said first calculating operation by a value calculated by said second calculating operation, and
said controller is still further configured to calculate said actual opening/closing timing, based on the value calculated by said first calculating operation, without using the value calculated by said second calculating operation, when abnormality occurs in said third detector in said prescribed range of engine speed.

8. The variable valve timing apparatus according to claim 7, wherein
said controller is further configured to detect said actual opening/closing timing based on said first calculating operation when said engine speed is higher than said prescribed range, and to detect said actual opening/closing timing based on said second calculating operation when said engine speed is lower than said prescribed range.

9. The variable valve timing apparatus according to claim 7, wherein
said controller is configured to stop, when abnormality occurs in said third detector while engine speed is in the range, in which said actual opening/closing timing is to be detected by said second calculating operation, detection of said actual opening/closing timing and to inhibit a change of said opening/closing timing by said actuator.

10. The variable valve timing apparatus according to claim 9, wherein
said controller is further configured to stop power supply to said actuator, when abnormality occurs in said third detector in said range of engine speed in which said actual opening/closing timing is to be detected by said second calculating operation.

11. The variable valve timing apparatus according to claim 7, wherein
said actuator is formed of a motor, and operation amount of said actuator is difference in rotation speed of said motor relative to said camshaft;
said changing mechanism changes said opening/closing timing such that ratio of amount of change of said opening/closing timing to the operation amount of said actuator differs and direction of change of said opening/closing timing is the same, when said opening/closing timing is in a first region and when it is in a second region; and
said controller is further configured to calculate amount of change of said actual opening/closing timing, based on correspondence between said opening/closing timing and said ratio obtained in advance and on the relative difference in rotation speed of said motor, and to calculate said actual opening/closing timing at present by adding the calculated amount of change to said actual opening/closing timing calculated last time.

12. The variable valve timing apparatus according to claim 7, wherein
said actuator is formed of a motor, and operation amount of said actuator is difference in rotation speed of said motor relative to said camshaft;
said controller is further configured to set a rotation speed command value of said motor in accordance with the relative difference in rotation speed of said motor corresponding to required amount of change of said opening/closing timing;
said variable valve timing apparatus further comprising
a motor control unit controlling rotation speed of said motor in accordance with said rotation speed command value by said controller; wherein
said motor control unit controls power supply to said motor by a combination of setting control based on said rotation speed command value set by said controller and said relative difference in rotation speed of said motor, and feedback control based on deviation of actual rotation speed from said rotation speed command value.

13. A method of detecting a valve phase of a variable valve timing apparatus for changing a timing of opening/closing at least one of an intake valve and an exhaust valve provided in an engine, wherein
said variable valve timing apparatus includes
an actuator;
a changing mechanism for changing the opening/closing timing, by changing difference in rotation phase of a camshaft driving the valve, of which opening/closing timing is to be changed, from rotation phase of a crankshaft by an amount of change in accordance with an operation amount of said actuator;
a first detector detecting a rotation angle of said crankshaft;
a second detector detecting a rotation angle of said camshaft; and
a third detector detecting the operation amount of said actuator;
said method of detecting valve phase comprising:
a first calculating step of calculating actual timing of opening/closing said valve of which opening/closing timing is to be changed, based on a relative relation between detected rotation angle of said crankshaft and detected rotation angle of said camshaft;

a second calculating step of calculating said actual opening/closing timing based on a detected accumulation of amount of change of said difference in rotation phase of said camshaft in accordance with the operation amount of said actuator;

a first selecting step of selecting one of said first and second calculating steps dependent on engine speed, for detecting said actual opening/closing timing;

a second selecting step of selecting both said first and second calculating steps to detect said actual opening/closing timing in a prescribed range of engine speed;

a third calculating step of calculating said actual opening/closing timing by modifying a value calculated at said first calculating step by a value calculated at said second calculating step; and a fourth calculating step of calculating said actual opening/closing timing, based on the value calculated at said first calculating step, without using the value calculated at said second calculating step, when abnormality occurs in said third detector in said prescribed range of engine speed.

14. The method of detecting valve phase of a variable valve timing apparatus according to claim 13, wherein at said first selecting step, when said engine speed is higher than said prescribed range, said first calculating step is selected, and when said engine speed is lower than said prescribed range, said second calculating step is selected.

15. The method of detecting valve phase of a variable valve timing apparatus according to claim 13, further comprising an abnormality processing step of stopping detection of said actual opening/closing timing when abnormality occurs in said third detector while engine speed is in the range in which said second calculation step is selected at said first selecting step, and inhibiting a change of said opening/closing timing by said actuator.

16. The method of detecting valve phase of a variable valve timing apparatus according to claim 15, further comprising a step of stopping power supply to said actuator, when the change of said opening/closing timing is stopped at said abnormality processing step.

17. The method of detecting valve phase of a variable valve timing apparatus according to claim 13, wherein said actuator is formed of a motor, and operation amount of said actuator is difference in rotation speed of said motor relative to said camshaft;

said changing mechanism changes said opening/closing timing such that ratio of amount of change of said opening/closing timing to operation amount of said actuator differs and direction of the change of said opening/closing timing is the same, when said opening/closing timing is in a first region and when it is in a second region; and said second calculating step has a sub-step of calculating amount of change of said actual opening/closing timing, based on correspondence between said opening/closing timing and said ratio obtained in advance and on the relative difference in rotation speed of said motor, and a sub-step of calculating said actual opening/closing timing at present by adding the calculated amount of change to said actual opening/closing timing calculated last time.

18. The method of detecting valve phase of a variable valve timing apparatus according to claim 13, wherein said actuator is formed of a motor, and operation amount of said actuator is difference in rotation speed of said motor relative to said camshaft;

said variable valve timing apparatus further includes a controller setting a rotation speed command value of said motor in accordance with the relative difference in rotation speed of said motor corresponding to required amount of change of said opening/closing timing, and a motor control unit controlling rotation speed of said motor in accordance with said rotation speed command value by said controller; and said motor control unit controls power supply to said motor by a combination of setting control based on said rotation speed command value set by said controller and said relative difference in rotation speed of said motor, and feedback control based on deviation of actual rotation speed from said rotation speed command value.

* * * * *